United States Patent
Hughes et al.

(10) Patent No.: US 6,697,209 B2
(45) Date of Patent: Feb. 24, 2004

(54) PHASE BASED TIME DOMAIN TRACKING FOR HELICAL SCAN TAPE DRIVE

(75) Inventors: Timothy C. Hughes, Boulder, CO (US); David E. Norton, Jr., Boulder, CO (US)

(73) Assignee: Exabyte Corporation, Boulder, CO (US)

(*) Notice: Subject to any disclaimer, the term of this patent is extended or adjusted under 35 U.S.C. 154(b) by 316 days.

(21) Appl. No.: 09/761,658

(22) Filed: Jan. 18, 2001

(65) Prior Publication Data

US 2002/0080519 A1 Jun. 27, 2002

Related U.S. Application Data

(60) Provisional application No. 60/246,724, filed on Nov. 9, 2000.

(51) Int. Cl.⁷ .......... G11B 5/584; G11B 15/14; G11B 15/46
(52) U.S. Cl. .......... 360/77.14; 360/64; 360/73.08
(58) Field of Search .......... 360/77.13, 77.14, 360/64, 73.04, 73.06, 73.07, 73.08

(56) References Cited

U.S. PATENT DOCUMENTS

| | | | |
|---|---|---|---|
| 4,303,953 A | * 12/1981 | Sanderson | 360/77.13 |
| 4,600,952 A | * 7/1986 | Igata et al. | 360/64 X |
| 4,835,628 A | 5/1989 | Hinz et al. | 360/48 |
| 4,843,495 A | 6/1989 | Georgis et al. | 360/77.15 |
| 4,868,692 A | 9/1989 | Nakase et al. | 360/77.16 |
| 5,065,261 A | 11/1991 | Hughes et al. | 360/70 |
| 5,068,757 A | 11/1991 | Hughes et al. | 360/77.13 |
| 5,095,394 A | * 3/1992 | Yanagihara | 360/77.14 |
| 5,142,422 A | 8/1992 | Zook et al. | 360/54 |
| 5,313,346 A | 5/1994 | Shimotashiro et al. | 360/77.13 |
| 5,325,246 A | 6/1994 | Guisinger et al. | 360/77.13 |
| 5,602,694 A | 2/1997 | Miles et al. | 360/84 |
| 5,680,269 A | 10/1997 | Georgis et al. | 360/77.13 |
| 5,726,826 A | 3/1998 | Miles et al. | 360/84 |

* cited by examiner

Primary Examiner—Andrew L. Sniezek
(74) Attorney, Agent, or Firm—Nixon & Vanderhye, P.C.

(57) ABSTRACT

In a helical scan recording system, magnetic tape (31) is transported by a tape transport (98) proximate a rotating scanner (85). The scanner has a pair of read heads (82) mounted thereon, e.g., a first read head and a second read head, which travel in a helical direction on the magnetic tape in view of the transport of the tape and rotation of the scanner. A synchronization detection system (38) determines a first synchronization mark detection time at which a first synchronization mark is read by the first read head from the first track, and a second synchronization mark detection time at which a synchronization mark read by the second read head from the second track. A position error signal generator (100) develops a position error signal (PES) based upon a difference between the first synchronization mark detection time and the second synchronization mark detection time. The servo or transport controller (98) uses the position error signal to develop a servo correction signal for adjusting the position of the read heads. In accordance with one aspect of the present invention, a first distance separating the sync marks along the helical direction of head travel is sufficiently less than a second distance by which the read heads of the pair are circumferentially separated on the scanner to render the position error signal (PES) immune to any variation in the rotational speed of the scanner. In accordance with another aspect of the invention, the position error signal generator comprises a coarse position error signal generator; a fine adjustment signal generator; and a combination element. The combination element combines a course position error signal and an adjustment signal to obtain the position error signal PES which is used by the servo controller to keep the read heads traveling along a longitudinal centerline of their respective tracks.

18 Claims, 14 Drawing Sheets

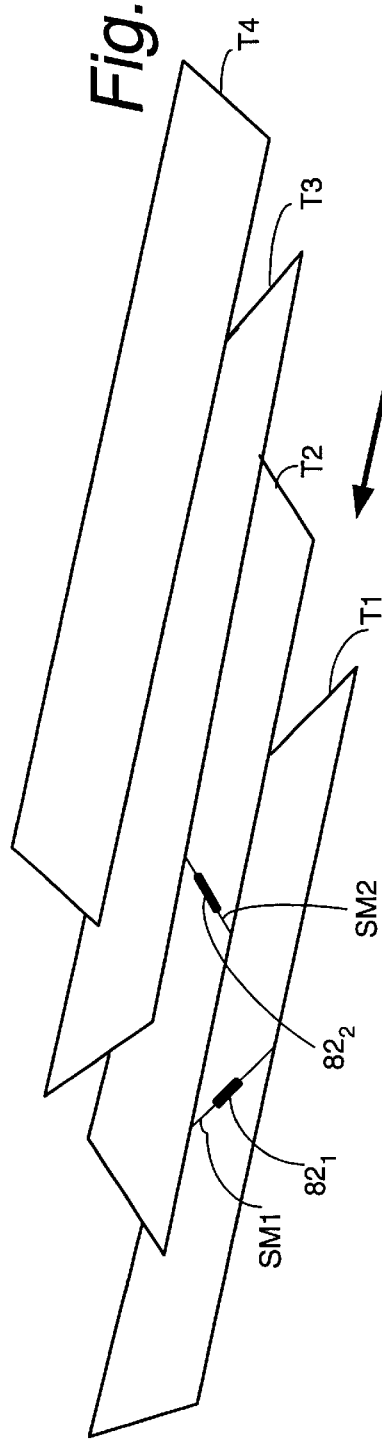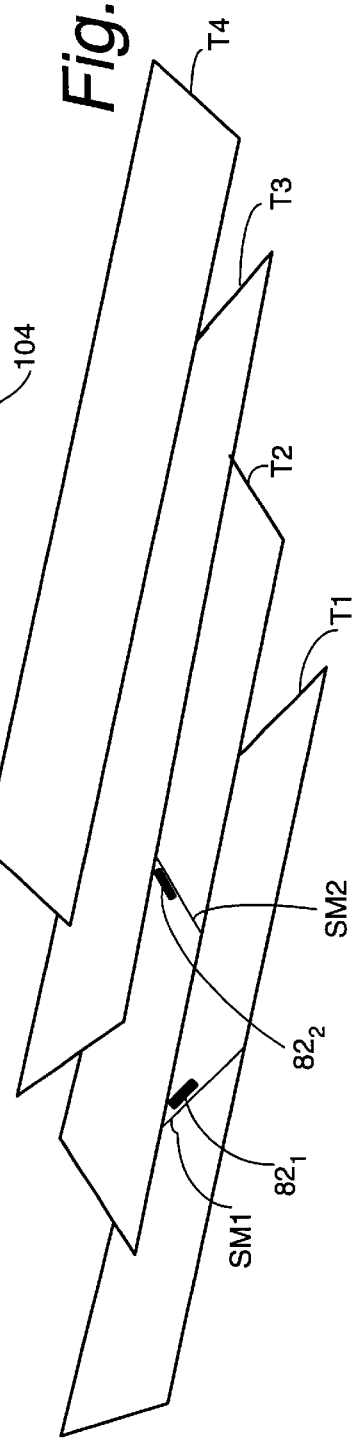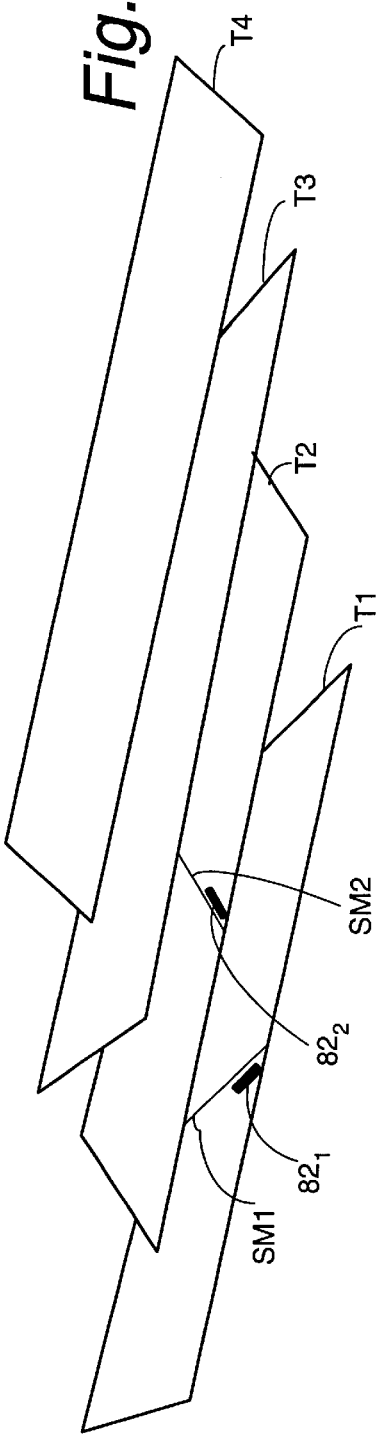

PHASE BASED TIME DOMAIN TRACKING FOR HELICAL SCAN TAPE DRIVE

This application claims the benefit and priority of U.S. Provisional patent application Ser. No. 60/246,724, filed Nov. 9, 2000, which is incorporated herein by reference in its entirety.

BACKGROUND

1. Field of the Invention

The present invention pertains to handling magnetic tape with a tape drive, and particularly tracking or servo control to ensure that heads of the tape drive correctly follow tracks of information recorded on the magnetic tape.

2. Related Art and Other Considerations

In magnetic recording on tape using a magnetic tape drive, relative motion between a head unit (typically with both a write element and a read element) and the tape causes a plurality of tracks of information to be transduced with respect to the tape. The magnetic tape is typically housed in a cartridge which is loaded into the tape drive. The tape extends between a cartridge supply reel and a cartridge take-up reel. The tape drive typically has a supply reel motor for rotating the cartridge supply reel and a take-up reel motor for rotating the cartridge take-up reel.

After the cartridge is loaded into the tape drive, the tape is extracted by mechanisms in the drive so that a segment of the tape is pulled from the cartridge and into a tape path that travels proximate the head unit. The extraction mechanisms take the form of tape guides which are mounted on trolleys. During the extraction operation, trolley motors move the trolleys along a predefined trolley path, so that the tape guides which surmount the trolleys displace the tape into the tape path as the trolleys travel along the trolley path. When the trolleys reach the full extent of travel along the trolley path, the tape is proximate the head unit. Thereafter the tape can be transported past the head unit, e.g., by activation of a capstan and/or the supply reel and take-up reel motors, depending upon the particular type of transport mechanisms employed.

In a helical scan arrangement, as the magnetic tape is transported the magnetic tape is at least partially wrapped around a rotating drum so that heads (both write heads and read heads) positioned on the drum are contiguous to the drum as the drum is rotated. One or more write heads on the drum physically record data on the tape in a series of discrete tracks of stripes oriented at an angle with respect to the direction of tape travel. As the tape is transported past the head unit, information can be transduced to or from the tape by the tape drive in recording and reading operations, respectively. The data is formatted, prior to recording on the tape, to provide sufficient referencing information to enable later recovery during readout by one or more read heads. Examples of helical scan tape drives are shown, inter alia, in the following U.S. patents (all of which are incorporated herein by reference): U.S. Pat. No. 4,835,628 to Hinz et al.; U.S. Pat. No. 4,843,495 to Georgis et al.; U.S. Pat. No. 5,065,261 to Hughes et al.; U.S. Pat. No. 5,068,757 to Hughes et al.; U.S. Pat. No. 5,142,422 to Zook et al.; and U.S. Pat. No. 5,602,694 to Miles et al. (which discloses a capstanless helical scan tape drive).

It is common in helical scan tape drives to provide some sort of tracking or servo system to ensure that the heads correctly follow the tracks or stripes, e.g., preferably over a longitudinal centerline of the tracks. Some helical scan tape drives sample a servo signal comprising an analog amplitude of a low frequency pattern written into the data format.

Two techniques have been employed to read this servo information. The first technique uses a wide on azimuth head that overlaps the track on either side of the track being followed. The information on either side of the track occurs at different times since subsequent tracks are staggered in helical recording. Because this information is staggered in time, it may be measured separately and compared. When the information on both sides of the track is of the same amplitude the head is on track and no correction is required. If the information is of different amplitude the head is off track, and the tape speed is modified to bring the drive back on track. This method requires an additional servo head that is of the opposite azimuth as the track being followed. The disadvantage of this additional head is not only cost; tracking error is also introduced because the servo head is not the head reading the data and additional error exists between these two heads. It also requires an additional read channel to processes this head.

A second technique is employed in a helical scan tape drive marketed by Exabyte Corporation as the Mammoth™ drive. The method used on the Mammoth drive differs in that rather than use an additional servo head, with the addition of a tracking offset, the servo information is read by using the read heads that read user data. The servo data with this type of system is now off azimuth with respect to the head that is reading it. In order to improve the signal to noise ratio of this servo information a low frequency is employed to construct it, as the off azimuth loss is not as great at low frequency. The disadvantage of this servo is therefore the large amount of overhead encountered in constructing the low frequency servo pattern. Additional servo signal processing circuitry is also required as the gain and bandwidth requirements of the servo are different than those of the read channel.

The disadvantages of certain current implementations are the need to provide analog processing of the servo information, overhead in the format for this information, as well as the additional cost of an additional head (if applicable) and processing circuitry. This analog processing circuitry has the additional disadvantage of being difficult to integrate in a cost-effective manner as mixed mode ASICs can be difficult to develop, and the circuitry, though being large, is not very expensive. Another disadvantage of these schemes is a head wider than the track being followed is required to measure the analog information from the adjacent tracks.

The following disclose magnetic tape drive systems wherein servo control involves determining a difference in reproduction time between servo signals recorded on the magnetic tape: U.S. Pat. No. 4,868,692 to Nakase et al.; U.S. Pat. No. 5,313,346 to Shimotashiro et al.; and U.S. Pat. No. 5,325,246 to Guisinger et al. Yet some of these servo schemes are adversely affected by variation in the rotational speed of the drum or scanner. Another deficiency of some of these servo schemes is incompatibility with the trend toward narrowing track width.

What is needed, therefore, and an object of the present invention, is a servo or tracking technique which is essentially impervious to variation in the rotational speed of the drum or scanner and/or compatible with narrow width tracks.

BRIEF SUMMARY OF THE INVENTION

In a helical scan recording system, magnetic tape is transported by a tape transport proximate a rotating scanner. The scanner has a pair of read heads mounted thereon, e.g., a first read head and a second read head, which travel in a helical direction on the magnetic tape in view of the transport of the tape and rotation of the scanner.

A synchronization detection system determines a first synchronization mark detection time at which a first synchronization mark is read by the first read head from the first track, and a second synchronization mark detection time at which a synchronization mark read by the second read head from the second track. A position error signal generator develops a position error signal (PES) based upon a difference between the first synchronization mark detection time and the second synchronization mark detection time. A servo or transport controller uses the position error signal to develop a servo correction signal for adjusting the position of the read heads.

In accordance with one aspect of the present invention, a first distance separating the sync marks along the helical direction of head travel is sufficiently less than a second distance by which the read heads of the pair are circumferentially separated on the scanner to render the position error signal (PES) immune to any variation in the rotational speed of the scanner.

In accordance with another aspect of the invention, the position error signal generator comprises a coarse position error signal generator; a fine adjustment signal generator; and a combination element. The coarse position error signal generator develops a coarse position error signal based upon a difference between first synchronization mark detection time and the second synchronization mark detection time, the first synchronization mark detection time and the second synchronization mark detection time being dependent upon byte clock resolution. The fine adjustment signal generator generates an adjustment signal to compensate for the first synchronization mark detection time and the second synchronization mark detection time being dependent upon byte clock resolution. The combination element combines the course position error signal and the adjustment signal to obtain the position error signal PES which is used by the servo controller to keep the read heads traveling along a longitudinal centerline of their respective tracks.

Various embodiments of fine adjustment signal generators are provided. In a first example embodiment, the synchronization detection system comprises a first deformatter and a second deformatter. The first deformatter outputs a first bit position signal to the fine adjustment signal generator indicative of a bit position in which the first synchronization mark is detectable. The second deformatter outputs a second bit position signal to the fine adjustment signal generator indicative of a bit position in which the second synchronization mark is detectable. The fine adjustment signal generator of this first example embodiment comprises a comparator which compares the first bit position signal and the second bit position signal to generate a bit offset as the adjustment signal.

In a second example embodiment, the fine adjustment signal generator comprises a ramp voltage circuit which ramps through a range of analog voltage values upon enablement by the first byte clock. Also included in the second example embodiment is a circuit which provides a digital value corresponding to an analog voltage reached in the range when a signal is output from the second byte clock. The digital value being indicative of a delay time, is applied as the adjustment signal.

In a third example embodiment, the fine adjustment signal generator comprises a high resolution delay measurement circuit which includes a chain of gate elements. Upon a transition of a signal from the first byte clock, the gate elements are successively switched from an inactive state to an active state. A predetermined time delay exists between successive activations of gate elements. A transition of a signal from the second byte clock enables the gate elements to output their states to a position detection circuit. The number of gate elements having the active state is indicative of a delay time which is used as the adjustment signal.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3A is a diagrammatic view showing two read heads centered over respective helical tracks on magnetic tape.

FIG. 3B and FIG. 3C are diagrammatic views showing two scenarios of two read heads not centered over respective helical tracks on magnetic tape.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Example Structure for Tape Drive

Figure 1:
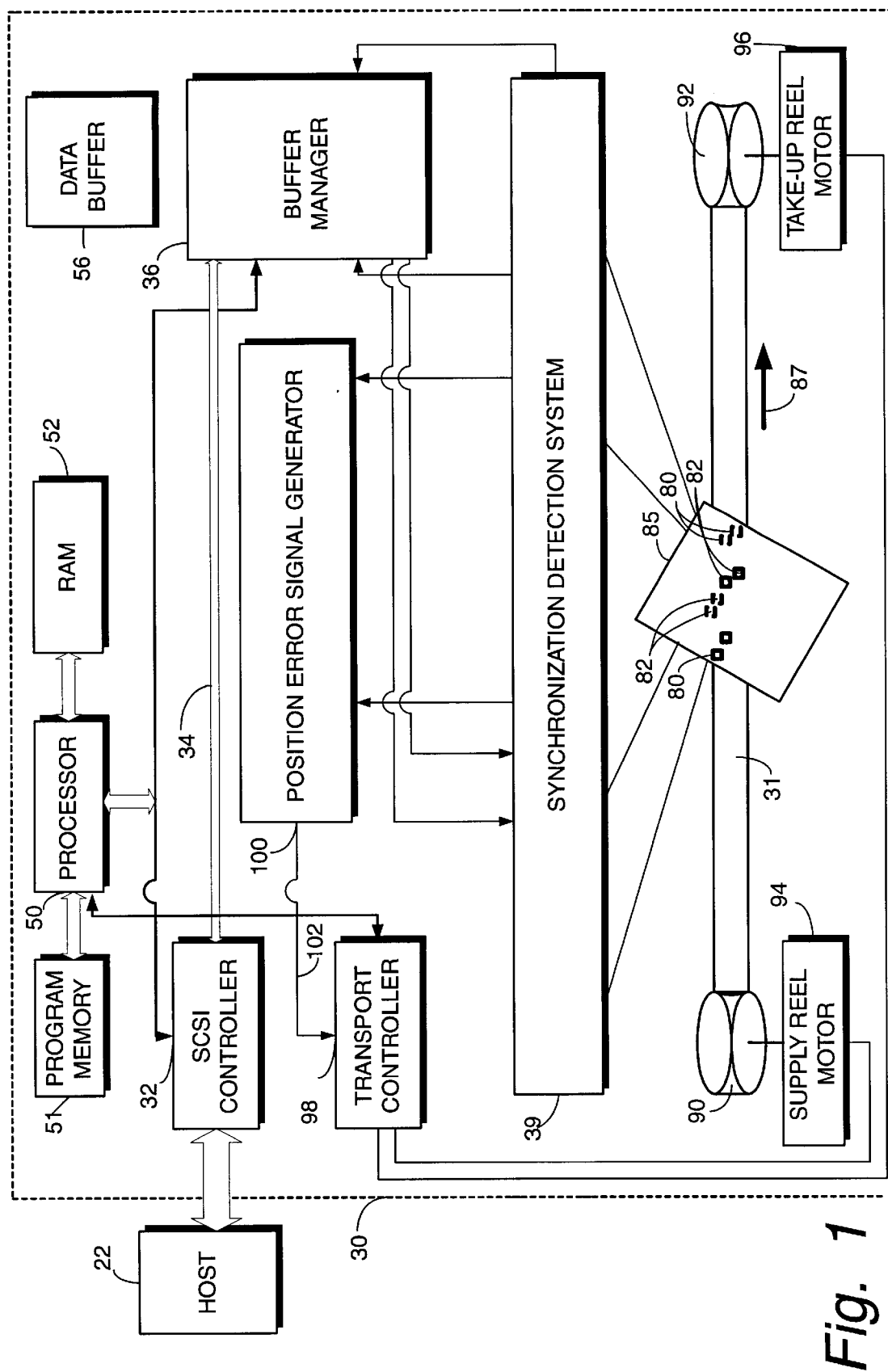
FIG. 1 is a schematic view of an example tape drive according to one embodiment of the present invention, the tape drive being connected to a host.

FIG. 1 shows a SCSI bus 20 which connects a host computer 22 and a first embodiment of a SCSI target storage device, particularly tape drive 30. In the illustrated embodiment, an example tape drive 30 is shown as a generic helical scan tape drive which transduces information on/from tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to synchronization detection system 38. The synchronization detection system 38 is connected to one or more recording element(s) or write head(s) 80 and to one or more read element(s) or read head(s) 82.

The write head(s) 80 and the read head(s) 82 are mounted on a peripheral surface of a rotatable drum or scanner 85. Tape 31 is wrapped around scanner 85 such that head(s) 80 and 82 follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around scanner 85.

A supply reel 90 and take-up reel 92 are driven by respective reel motors 94 and 96 to transport tape 31 in the direction 87. Reel motors 94 and 96 are driven by transport controller 98, which ultimately is governed by processor 50. Operation and control of the tape transport mechanism of this second type of tape drive including reel motors 94 and 96 is understood by the person skilled in the art with reference, for example, to U.S. Pat. No. 5,680,269 and incorporated herein by reference.

The synchronization detection system 38 is connected to apply signals to position error signal generator 100. In the manner explained hereinafter, position error signal generator 100 generates a position error signal (PES) 102 based on signals received from synchronization detection system 38. The position error signal (PES) 102 is applied to transport controller 98.

Figure 2:
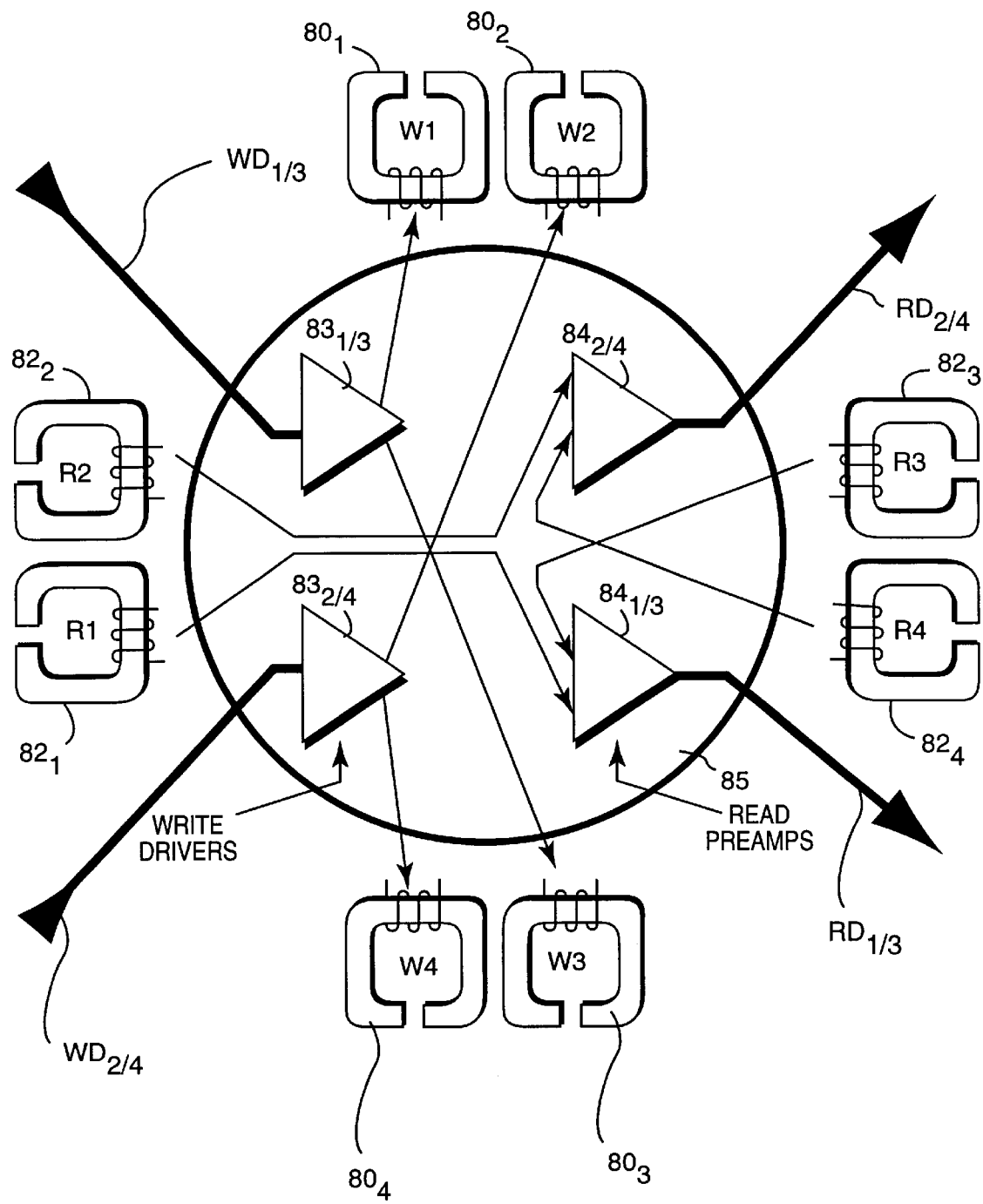
FIG. 2 is a schematic view of an example scanner, showing write and read heads as well as certain scanner-mounted electronics.

In one example embodiment, four write heads and four read heads are mounted on the drum 85, with each channel being switchably connected to two heads. FIG. 2 schematically illustrates drum 85, also known as a scanner, which has four write heads $80_1$–$80_4$ and four read heads $82_1$–$82_4$ mounted on its periphery. FIG. 2 does not show the four write heads $80_1$–$80_4$ and four read heads $82_1$–$82_4$ as being precisely mounted, but rather arranged about the drum 85 in a general pattern of head placement. It should be understood, however, that the four write heads $80_1$–$80_4$ and four read heads $82_1$–$82_4$ are, in fact, mounted on the periphery of scanner 85 for transducing information relative to tape 31. The present invention is not limited by such factors as, for example, the number of heads employed.

In addition to write heads 80 and read heads 82, as further shown in FIG. 2 scanner 85 also has certain electronics mounted thereon. The scanner-mounted electronics include write drivers $83_{1/3}$ and $83_{2/4}$, as well as read preamplifiers $82_{1/3}$ and $82_{2/4}$. Write data signals are applied on lines shown generally as $WD_{1/3}$ and $WD_{2/4}$ in FIG. 8 to write drivers $83_{1/3}$ and $83_{2/4}$, respectively. As the subscripts indicate, the write data carried by line $WD_{1/3}$ is applied to write driver $83_{1/3}$, which supplies a write data signal to write heads $80_1$ and $80_3$. The write data carried by line $WD_{2/4}$ is applied to write driver $83_{2/4}$, which supplies a write data signal to write heads $80_2$ and $80_4$. Because the tape is only wrapped 180 degrees around the scanner 85, only one of the two write heads on each write driver is in contact with the tape at a time. In other words, during a first portion of the revolution of scanner 85, the write head 801 is connected to write driver $83_{1/3}$, while during a second portion of the revolution of scanner 85, the write head $80_3$ is connected to write driver $83_{1/3}$. Similarly, during a first portion of the revolution of scanner 85, the write head $80_2$ is connected to write driver $83_{2/4}$, while during a second portion of the revolution of scanner 85, the write head $80_4$ is connected to write driver $83_{2/4}$. So the separation of the data on the two heads is in time, and the same data lines may be used to couple the write data into the scanner. An unillustrated control element switches the heads at the appropriate time dependent on scanner position.

In converse fashion, the data transduced by read heads $82_1$ and $82_3$ are applied to read preamplifier $84_{1/3}$, while the data transduced by read heads $82_2$ and $82_4$ are applied to read preamplifier $84_{2/4}$. The outputs from read preamplifier $84_{1/3}$ and read preamplifier $84_{2/4}$ are transmitted from scanner 85 as read data signals on lines shown generally as $RD_{1/3}$ and $RD_{2/4}$, respectively, in FIG. 2. During a first portion of the revolution of scanner 85, the read head $82_1$ is connected to read preamplifier $84_{1/3}$, while during a second portion of the revolution of scanner 85, the read head $82_3$ is connected to read preamplifier $84_{1/3}$. Similarly, during a first portion of the revolution of scanner 85, the read head $82_2$ is connected to read preamplifier $84_{2/4}$, while during a second portion of the revolution of scanner 85, the read head $82_4$ is connected to read preamplifier $84_{2/4}$.

In addition to the electronics illustrated in FIG. 2, other electronics are provided on scanner 85. Included in the unillustrated electronics is the supply of voltage to 85, which is understood with reference to U.S. patent application Ser. No. 09/492,345, now U.S. Pat. No. 6,344,981 filed Jan. 27, 2000, entitled "Power Supply Circuit And Method Of Calibration Therefor", which is incorporated herein by reference in its entirety.

Time Domain Tracking

The present invention involves a time domain tracking system and technique which is facilitated by, e.g., synchronization detection system 38, position error signal generator 100, and transport controller 98. The time domain tracking system and technique of the present invention are described below primarily with reference to two read heads 82. In the FIG. 1 example implementation, the two read heads are those which by switching are connected to synchronization detection system 38. Thus, during a first half of a rotation of scanner 85, the two read heads involved are read heads $82_1$ and $82_2$. During a second half of a rotation of scanner 85, the two read heads involved are read heads $82_3$ and $82_4$.

FIG. 3A shows read head $82_1$ following track T1 and read head $82_2$ following track 2 during a first half of a scanner rotation, with read head $82_1$ and read head $82_2$ being centered over their respective tracks T1 and T2. As illustrated in FIG. 3A, read head $82_1$ and read head $82_2$ have different azimuth angles. The read head $82_1$ and read head $82_2$ both travel in a helical direction indicated by arrow 104. Track T1 has a servo or synchronization mark (sync mark) SM1; track T2 has a servo or synchronization mark (sync mark) SM2. In actuality, the read head $82_1$ and read head $82_2$ are wider than their respective tracks T1 and T2, but for sake of enabling the respective sync marks SM1 and SM2 to be viewed the read head $82_1$ and read head $82_2$ are shown as being shorter (in the dimension of the width of the tracks) than their respective tracks. Although there are plural sync marks for each track periodically recorded as subsequently explained, for sake of simplicity, FIG. 3A shows only one sync mark for each track. In the scenario shown in FIG. 3A, the read head $82_1$ and read head $82_2$ are positioned directly over the respective sync marks SM1 and SM2 of their respective tracks T1 and T2. It will be understood that, in a second half of the scanner rotation, essentially the same situation occurs for read head $82_3$ and read head $82_4$ with respect to their respective tracks T3 and T4.

FIG. 3B and FIG. 3C illustrate that, as the read heads moves off track (e.g., off the center of the width of the tracks), the data from one of the two read heads comes later, and from the other of the two read heads channel comes earlier. For example, in FIG. 3B read head $82_1$ and read head $82_2$ have been shifted to the upper edge of their respective tracks, i.e., from the center of the width of the track to a longitudinal edge of the track. In FIG. 3B, the position of the head along the track (from the beginning of the track) has not been altered. Read head $82_2$ on the upper track (track T2) has moved to the left of sync mark SM2, which implies that read head $82_2$ has already crossed sync mark SM2 and thus that sync mark SM2 has effectively moved earlier in time. The bottom read head $82_1$ on track T1 has moved to the right of sync mark SM1. At this point read head $82_1$ has not yet crossed sync mark SM1, thus sync mark SM1 has moved later in time.

In FIG. 3C read head $82_1$ and read head $82_2$ have been moved to the bottom edge of the track. As in FIG. 3B, the positions of read head $82_1$ and read head $82_2$ along their respective tracks T1 and T2 have not been altered. In FIG. 3C, the read head $82_1$ and read head $82_2$ have moved in the opposite direction than that of FIG. 3B.

The timing relationship between sync marks of two tracks, e.g., SM1 and sync mark SM2, can be used to servo the position of the read heads to ensure that the read heads continue to follow the longitudinal centerlines of the tracks. In the present invention, the synchronization detection system 38 locates the sync marks, and outputs signals $1^{st}$ SYNC MARK FOUND and 2nd SYNC MARK FOUND to position error signal generator 100. In the manner subsequently described, the position error signal generator 100 uses, e.g., the signals $1^{st}$ SYNC MARK FOUND and 2nd SYNC MARK FOUND to generate a position error signal (PES) 102. The position error signal (PES) 102 is applied to transport controller 98. The position error signal (PES) 102 effectively tells transport controller 98 how to control transport of the tape 31 so that the read heads will tend to travel back to the centerlines of the tracks they follow. In the present invention, the position error signal (PES) 102 is used by transport controller 98 to control the linear speed of tape 31. The linear speed of tape 31 is controlled by effectively controlling one or both of supply reel motor 94 and take-up reel motor 96. Controlling tape transport in this manner in understood, e.g., with reference to U.S. Pat. Nos. 5,726,826; 5,680,269; and 5,602,694, which are incorporated herein by reference in their entirety.

The timing sensitivity of the position error signal (PES) 102 is based on various geometries of the tape drive system. Such geometries include the azimuth angles, track width, head velocity, head width, and read clock. In one example embodiment, the azimuth angles are 20 degrees and −10 degrees, the track width is 3 microns, the head velocity is 14.7 meters per second, the head width is 2 microns, and the read clock is 103 MHz. In this example embodiment, the gain of this error signal is provided by Expression 1:

Express in terms of nS per micron:

$$\frac{\Delta T \cdot 10^{-6}}{\Delta Y \cdot 10^{-9}} = 36.755 \, nS/\mu \qquad \text{Expression 1}$$

Thus, using Expression 1, given a value of position error signal (PES) 102 in nano seconds, transport controller 98 can determine by how many microns the read heads are off the centerlines of their respective tracks.

Using a 103 MHz clock as in the example embodiment, the resolution per bit of position error signal (PES) 102 is provided by Expression 2:

Express in terms of microns of resolution:

$$\frac{\Delta Y}{\text{Res\_in\_Bits} \cdot 10^{-6}} = 0.264 \text{ microns per bit. 15} \qquad \text{Expression 2}$$

This resolution results in an signal to noise ratio (SNR) determined in Expression 3 (in dB):

$$SNR := 20 \cdot log(Res\_in\_Bits) \quad SNR = 23.604 \qquad \text{Expression 3}$$

Enhancements for providing even greater granularity of position error signal (PES) 102 are discussed subsequently.

Figure 4:
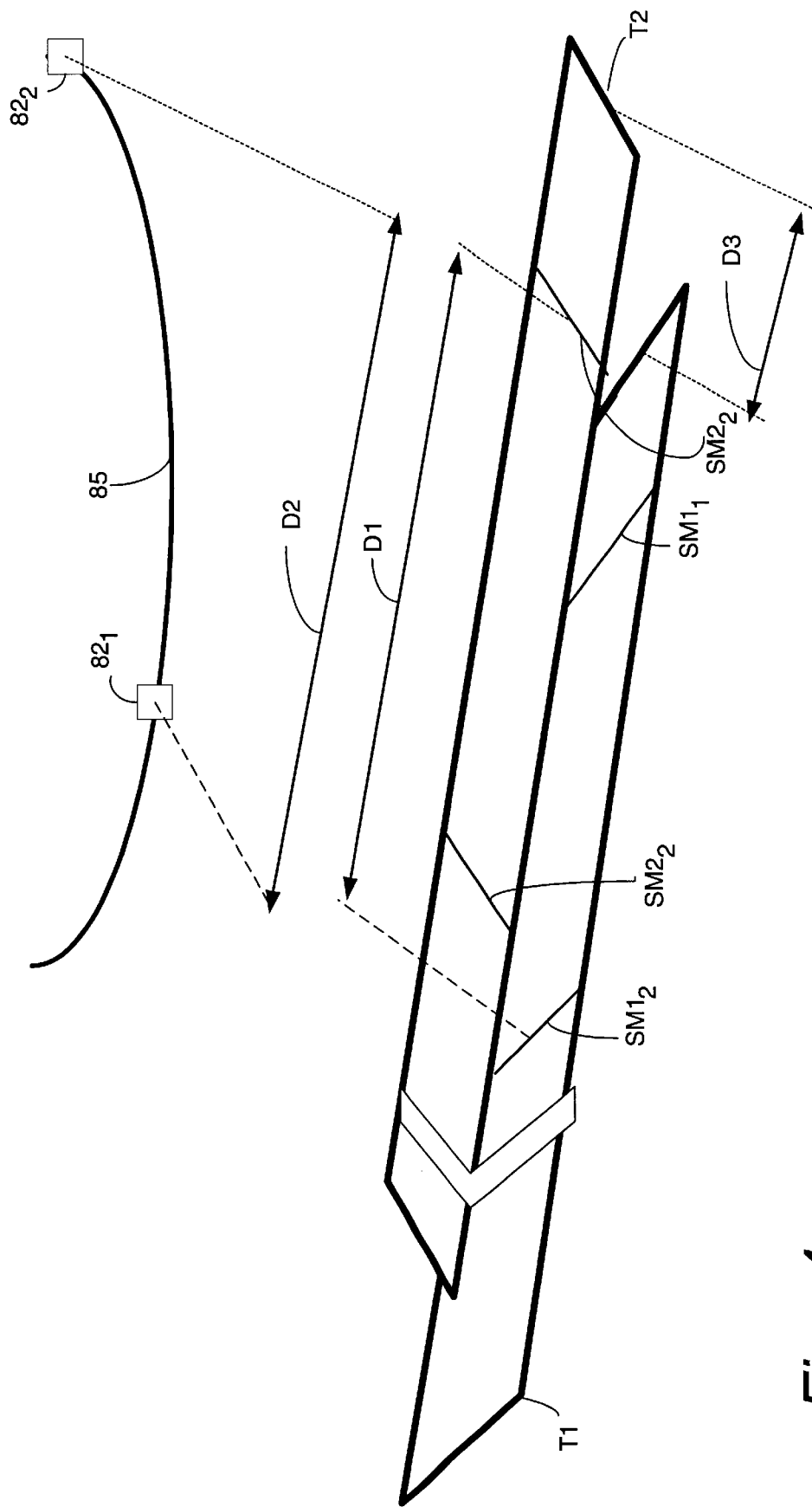
FIG. 4 is a diagrammatic views showing a relationship between a distance separating sync marks SM and a distance separating read heads of a pair of read heads on a scanner in accordance with one aspect of the invention.

One aspect of the present invention, illustrated in FIG. 4, is that a first distance D1 (between the synchronization mark read by the first read head on the first track and the synchronization mark read by the second read head on the second track) is sufficiently less than a second distance D2 (by which the first head is spaced circumferentially on the scanner from the second head) to render the position error signal immune to any variation in the rotational speed of the scanner. As indicated previously, each track T has plural sync marks SM, of which two sync marks are shown for each track in FIG. 4. It should be understood, since FIG. 4 shows only a beginning and end of each of the tracks T1 and T2, that a greater number of sync marks may be recorded on each track, e.g., sixty sync marks in one embodiment.

Thus, track T1 has first sync mark $SM1_1$ and second sync mark $SM1_2$; track T2 has first sync mark $SM2_1$ and second sync mark $SM2_2$; and so forth. In the illustrated embodiment, the position error signal (PES) 102 is the time lapse between a first read head of a pair detecting sync mark $SM1_{n+1}$ on track T1 and a second read head of the same pair detecting sync mark $SM2_n$ on track T2. The position error signal (PES) 102 is determined for each of the sync marks SM on a track except the first sync mark on track T1 and the last sync mark on track T2. For the situation shown in FIG. 4, a first position error signal (PES) 102 for the track pair comprising tracks T1 and T2 is the time lapse between a first read head of a pair detecting sync mark $SM1_2$ on track T1 and a second read head of a pair detecting sync mark $SM2_1$ on track T2.

FIG. 4 is not drawn to scale, but rather for sake of convenience of illustration. In one illustrated embodiment, the distance D1 is about 1350 microns, the distance D2 is about 1320 microns, and the distance D3 (from the beginning of the center of track T2 to the beginning of the center of track T1) is about 110 microns.

Synchronization Detection

Figure 5:
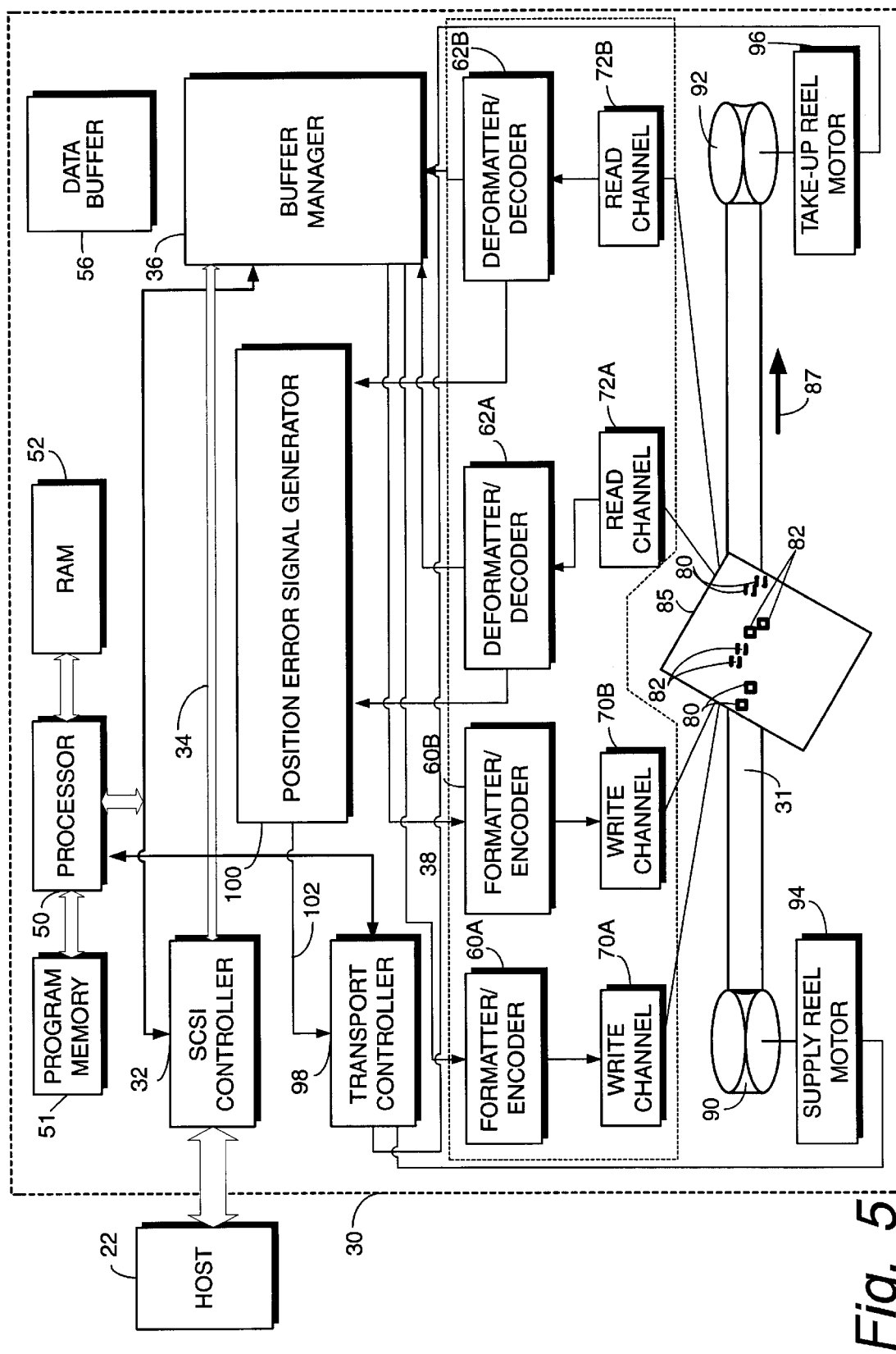
FIG. 5 is a schematic view of an example tape drive according to one embodiment of the present invention, showing certain further details of a synchronization detection system.

FIG. 5 illustrates one example embodiment of synchronization detection system 38 which comprises two formatter/encoders 60A and 60B and two deformatter/decoders 62A and 62B, as well as two respective write channels 70A and 70B and two respective read channels 72A and 72B. Buffer manager 36 is connected to the two formatter/encoders 60A and 60B and to the two deformatter/decoders 62A and 62B. Formatter/encoders 60 and deformatter/decoders 62 are, in turn, respectively connected to the write channels 70 and read channels 72. In particular, formatter/encoder 60A and formatter/encoder 60B are respectively connected to write channel 70A and write channel 70B, respectively, while deformatter/decoder 62A and deformatter/decoder 62B are connected to read channel 72A and read channel 72B, respectively. Each write channel 70 is connected to one or more recording element(s) or write head(s) 80; each read channel is connected to one or more read element(s) or read head(s) 82. As previously explained, the write head(s) 80 and the read head(s) 82 are mounted on the rotatable drum or scanner 85. In the illustrated embodiment, each of the channels 70A, 70B, 72A, and 72B are connected to two heads, the connection between the two heads being switched with respect to each channel in accordance with rotational position of scanner 85.

Those skilled in the art will appreciate that each write channel 70 includes various circuits and elements including a RLL modulator, a parallel-to-serial converter, and write current modulator. Similarly, the person skilled in the art understands that each read channel 72 includes a data pattern and clock recovery circuitry, a serial-to-parallel converter, and, an RLL demodulator. These and other aspects of tape drive 30, including, e.g., error correction, are not necessary for an understanding of the invention and accordingly are not specifically described herein.

In a manner explained subsequently, each of the deformatter/decoders 62 generates a signal when the deformatter/decoder 62 detects a synchronization mark in the data stream received from its associated read channel 72. For example, a deformatter/decoder 62 which handles a first track of a track pair (such as track T1 in FIG. 4) outputs a $1^{st}$ SYNC MARK FOUND signal when the sync mark $SM1_{n+1}$ (n>0) is encountered on the first track of the pair, after which the deformatter/decoder 62 which handles a second track of a track pair (such as track T2 in FIG. 4) outputs a $2^{nd}$ SYNC MARK FOUND signal when the sync mark $SM1_n$ on the second track of the pair. The sync mark SM is typically a string of bits, spanning several bytes, which has a unique value not valid in user data. In addition, and as explained subsequently, the deformatter/decoders 62 can output other signals, depending on the particular embodiment of position error signal generator 100 with which the synchronization detection system 38 is employed.

Position Error Signal Generation

Figure 6:
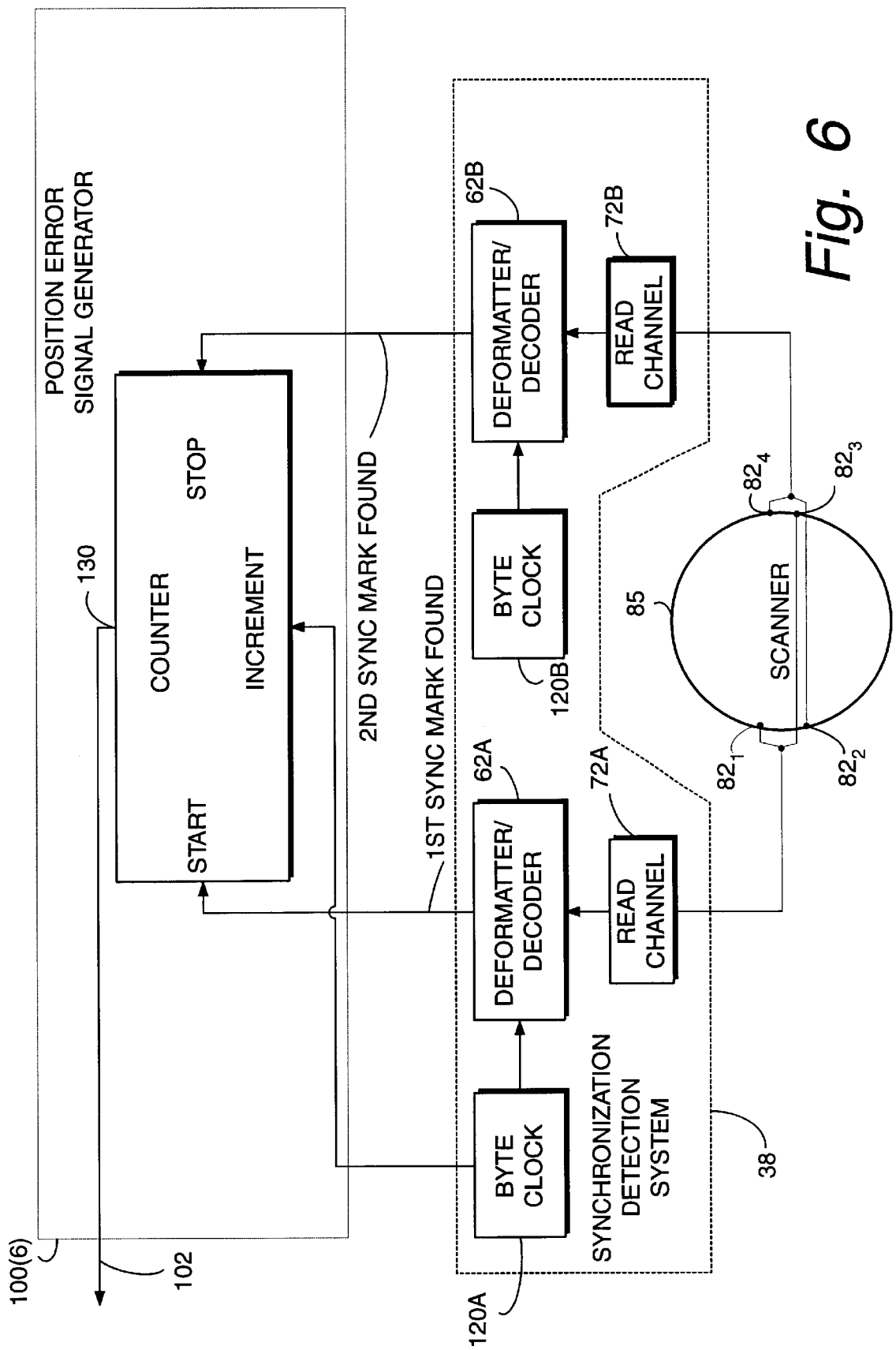
FIG. 6 a schematic view of showing yet further details of a synchronization detection system and a first embodiment of a position error signal generator.

Yet more details of synchronization detection system 38, and a first embodiment of a position error signal generator 100(6), are illustrated in FIG. 6. As shown in FIG. 6, the deformatter/decoders 62A and 62B locate their respective sync marks SM using byte clocks 120A and 120B, respectively. The byte clocks 120A and 120B are generally used to clock out a byte of information acquired from the respective read channels 72A, 72B. But the byte clocks 120 are also employed to generate the $1^{st}$ SYNC MARK FOUND and $2^{nd}$ SYNC MARK FOUND output signals. In this regard, when one of the deformatter/decoders 62 has finished processing a byte which includes the last bit of a bit pattern forming the sync mark SM, the appropriate one of the $1^{st}$ SYNC MARK FOUND and $2^{nd}$ SYNC MARK FOUND output signal is generated by that deformatter/decoder 62.

The synchronization detection system 38 of FIG. 6 with its $1^{st}$ SYNC MARK FOUND and $2^{nd}$ SYNC MARK FOUND output signals can be used by position error signal generator 100 to determine a coarse position error signal to serve as position error signal (PES) 102. Thus, the drive of the FIG. 6 embodiment basically uses the channel clock (e.g., byte clocks 120) to generate the position error signal (PES) 102. In this regard, the position error signal generator 100(6) comprises a counter 130 which is started upon generation of the $1^{st}$ SYNC MARK FOUND from deformatter/decoder 62A. The counter 130 essentially counts the number of bytes processed by deformatter/decoder 62A after generation of the $1^{st}$ SYNC MARK FOUND until counter 130 is stopped by receipt of the $2^{nd}$ SYNC MARK FOUND from deformatter/decoder 62B. During this time interval the counter 130 counts the number of bytes clocked off by byte clock 120A.

Figure 7:
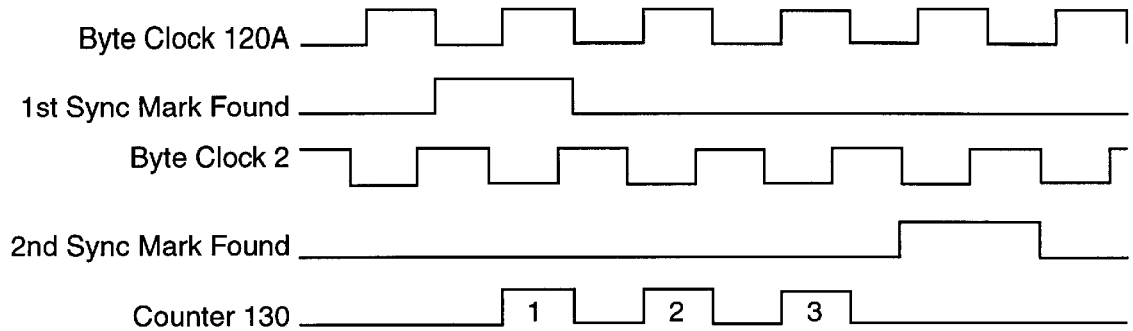
FIG. 7 is a graph depicting generation of a coarse position error signal (PES) and the operation of the position error signal generator illustrated in FIG. 6.

Example operation of the position error signal generator 100(6) of FIG. 6 is depicted in the graph of FIG. 7. In the example scenario of FIG. 7, the sync mark SM1 is found somewhere during the first pulse of byte clock 120A, so that at the end of the first pulse of byte clock 120A the $1^{st}$ SYNC MARK FOUND signal is generated by deformatter/decoder 62A. The byte clock 120A outputs three more clock pulses, used to increment counter 130, before the $2^{nd}$ SYNC MARK FOUND signal is generated by deformatter/decoder 62B. Thus, as shown in FIG. 7, the counter 130 has the value "3", which is output as the position error signal (PES) 102 when this coarse embodiment is acceptable.

Figure 8:
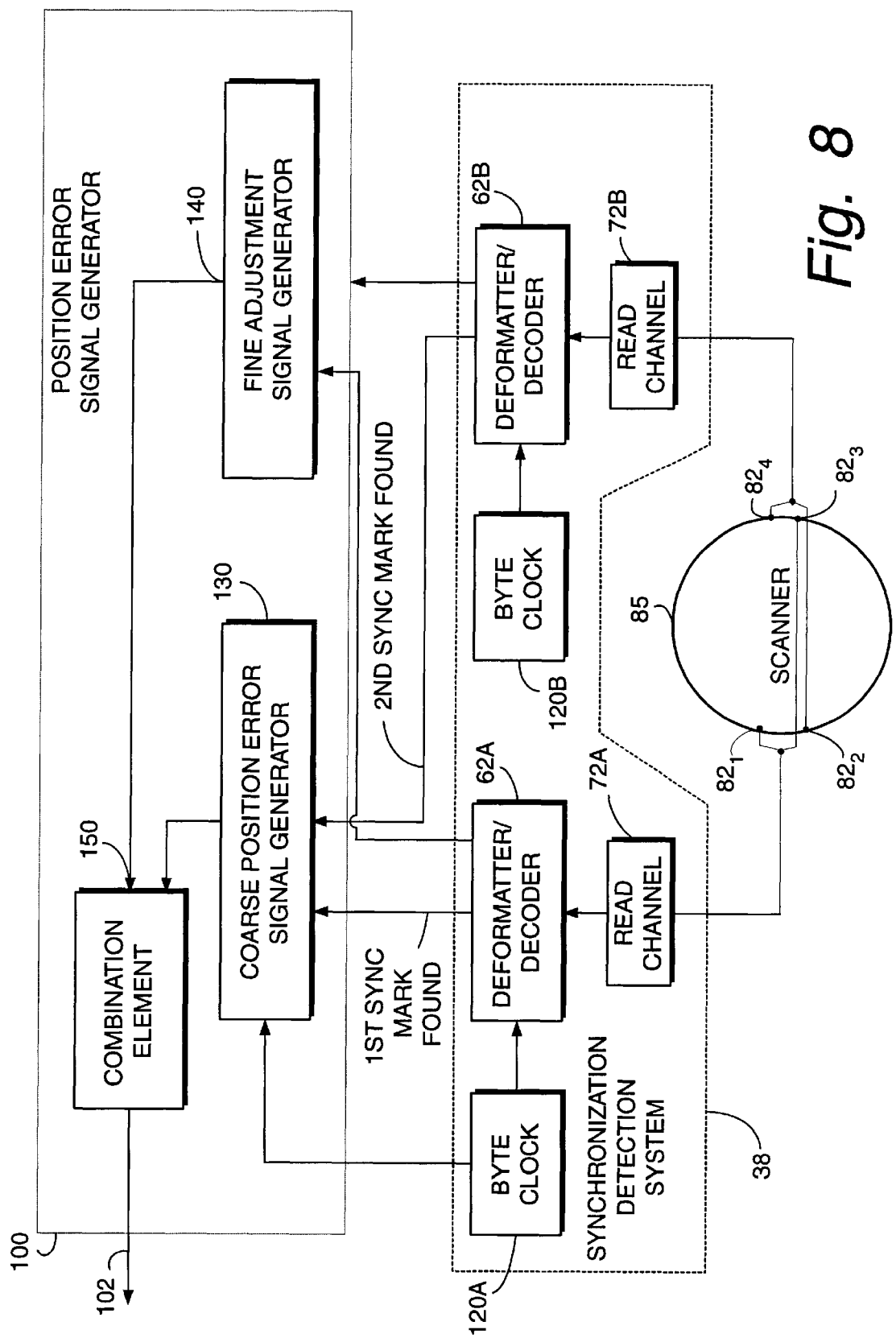
FIG. 8 a schematic view of details of a synchronization detection system and a generic embodiment of a position error signal generator having a fine adjustment signal generator.

Other embodiments, illustrated generically by position error signal generator 100(8) of FIG. 8, generate values for position error signal (PES) 102 that are more refined than the coarse value output by position error signal generator 100(6) of FIG. 6. The position error signal generator 100(8) includes a coarse position error signal generator which is essentially the counter 130 discussed above with reference to FIG. 6. In addition, the generic position error signal generator 100(8) includes a fine adjustment signal generator 140 and a combination element 150.

Figure 8A:
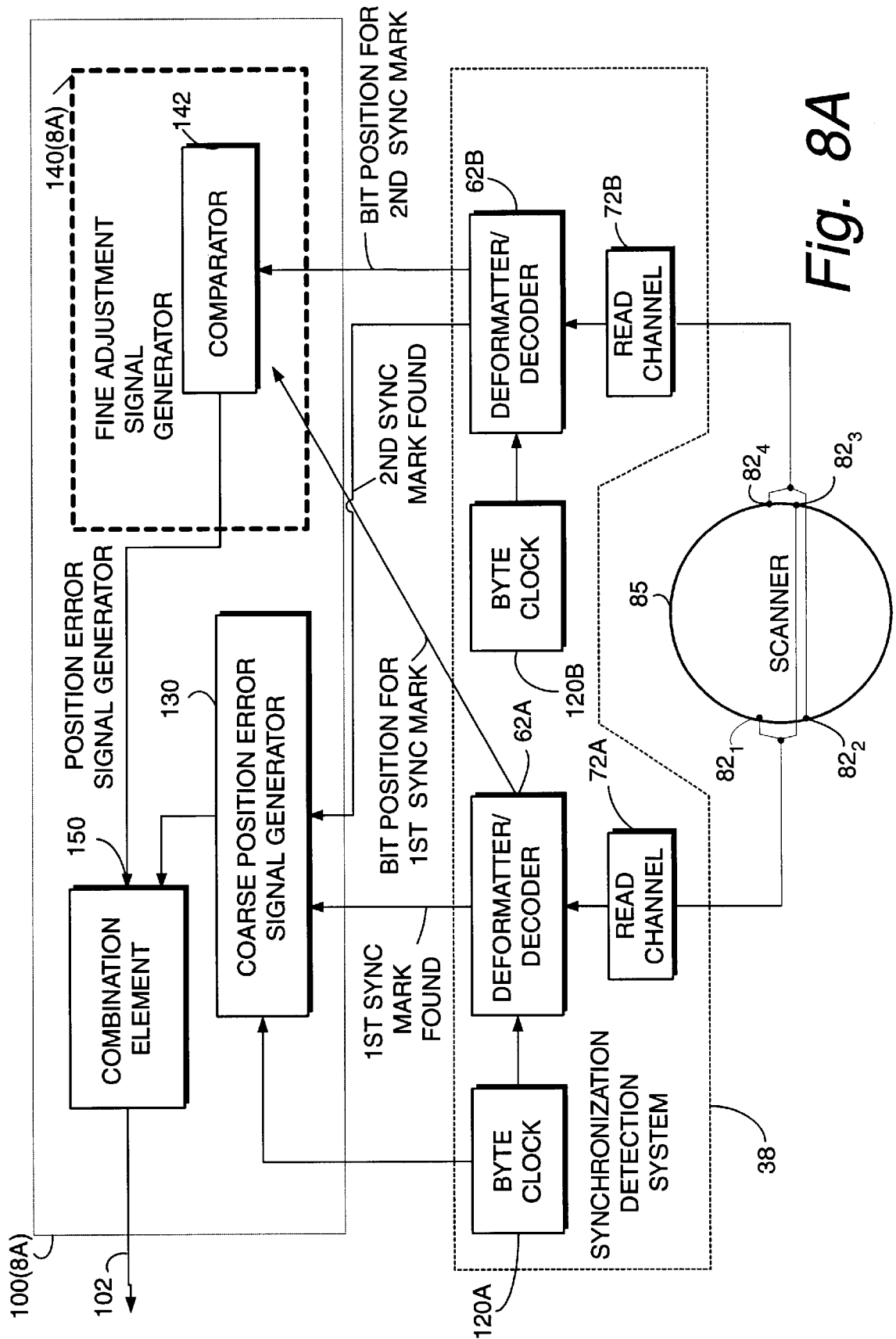
FIG. 8(A)–FIG. 8(C) are schematic views showing other embodiments of a position error signal generator having a fine adjustment signal generator.

FIG. 8A shows an embodiment in which position error signal generator 100(8A) comprises a comparator 142. In the FIG. 8A embodiment, the deformatter/decoders 62A and 62B not only output the $1^{st}$ SYNC MARK FOUND and $2^{nd}$ SYNC MARK FOUND signals, respectively, but also an indication of the bit position in which the last bit of the sync mark SM was located. For example, deformatter/decoder 62A outputs a signal BIT POSITION OF $1^{ST}$ SYNC MARK and deformatter/decoder 62B outputs a signal BIT POSITION OF 2nd SYNC MARK, as shown in FIG. 8A. The comparator 142 determines the difference between the two bit positions indicated by the BIT POSITION OF $1^{ST}$ SYNC MARK and BIT POSITION OF 2nd SYNC MARK signals, and generates an offset value indicative of the difference for application to a second input terminal of combination element 150. A first input terminal of combination element 150 receives the coarse position error signal (PES) determined in the manner previously discussed with reference to FIG. 6, for example.

Figure 9:
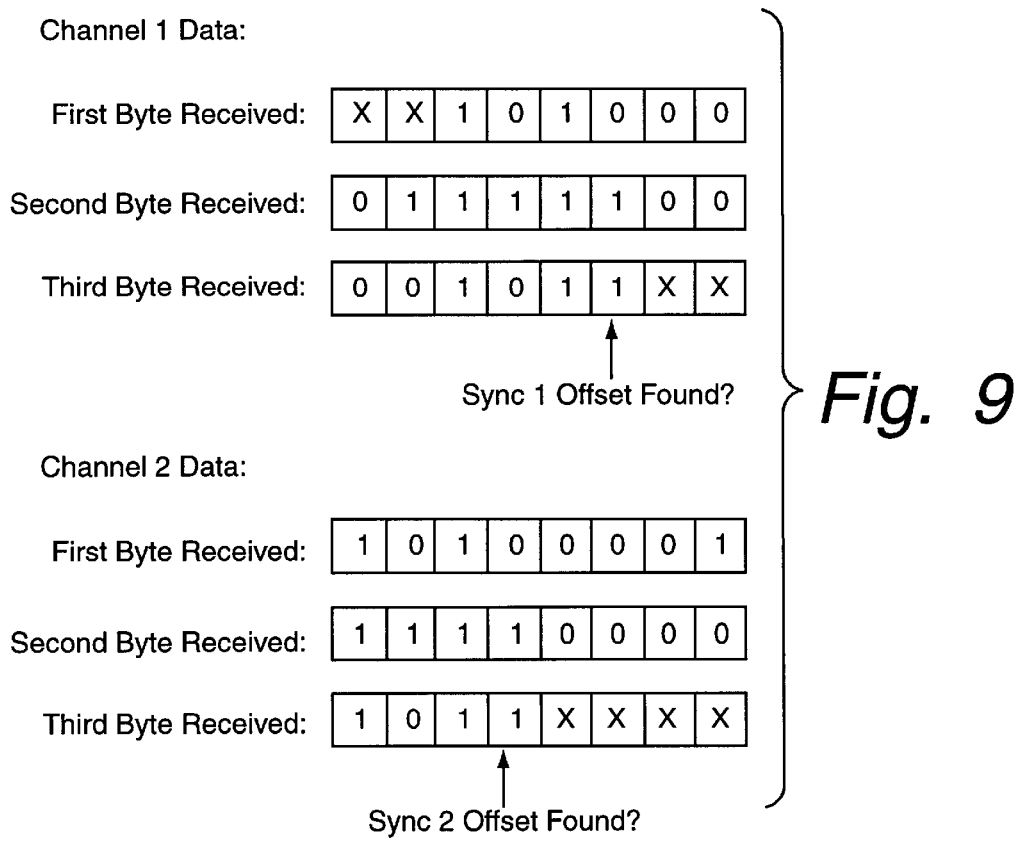
FIG. 9 is a diagrammatic view showing detection of bit position of sync marks in data streams acquired by read channels in accordance with the embodiment of FIG. 8A.

FIG. 9 illustrates a scenario reflecting operation of the position error signal generator 100(8A) of FIG. 8A. In FIG. 9, the channel 1 data is data obtained by read channel 72A, while the channel 2 data is data obtained by read channel 72B. FIG. 9 shows that deformatter/decoder 62A locates the first sync mark SM after receiving the $6^{th}$ bit of the third byte. Therefore, the value outputted by deformatter/decoder 62A for the BIT POSITION OF $1^{ST}$ SYNC MARK signal is 6. The deformatter/decoder 62B, on the other hand, locates the second sync mark SM after receiving the $4^{th}$ bit of the third byte. Thus, the value outputted by deformatter/decoder 62B for the BIT POSITION OF 2nd SYNC MARK signal is 4. Upon receiving the BIT POSITION OF $1^{ST}$ SYNC MARK and BIT POSITION OF 2nd SYNC MARK signals, the comparator 142 determines that there is a −2 (negative two) bit offset between the position of the two sync marks. Accordingly, the offset value output by comparator 142 to combination element 150 is −2. Assuming that the foregoing occurs in the context of the FIG. 7 scenario previously discussed, the position error signal (PES) 102 output from combination element 150 would thus be 3 bytes less 2 bits.

The resolution of the systems thus far described is dependent upon the bit frequency of the byte clocks 120. Such resolution is generally sufficient to provide adequate SNR for tracks of conventional width and pitch. However, it is expected that the future will bring gains in density realized by decreases in track pitch, and the expected increases in clock frequency may not be sufficient for the expected decreases in track pitch. Accordingly, the embodiments of FIG. 8B and FIG. 8C provide techniques for generating a position error signal (PES) 102 that not only make use of the byte clock to determine the coarse error, but also include more sophisticated means for measuring the fine error.

Figure 8B:
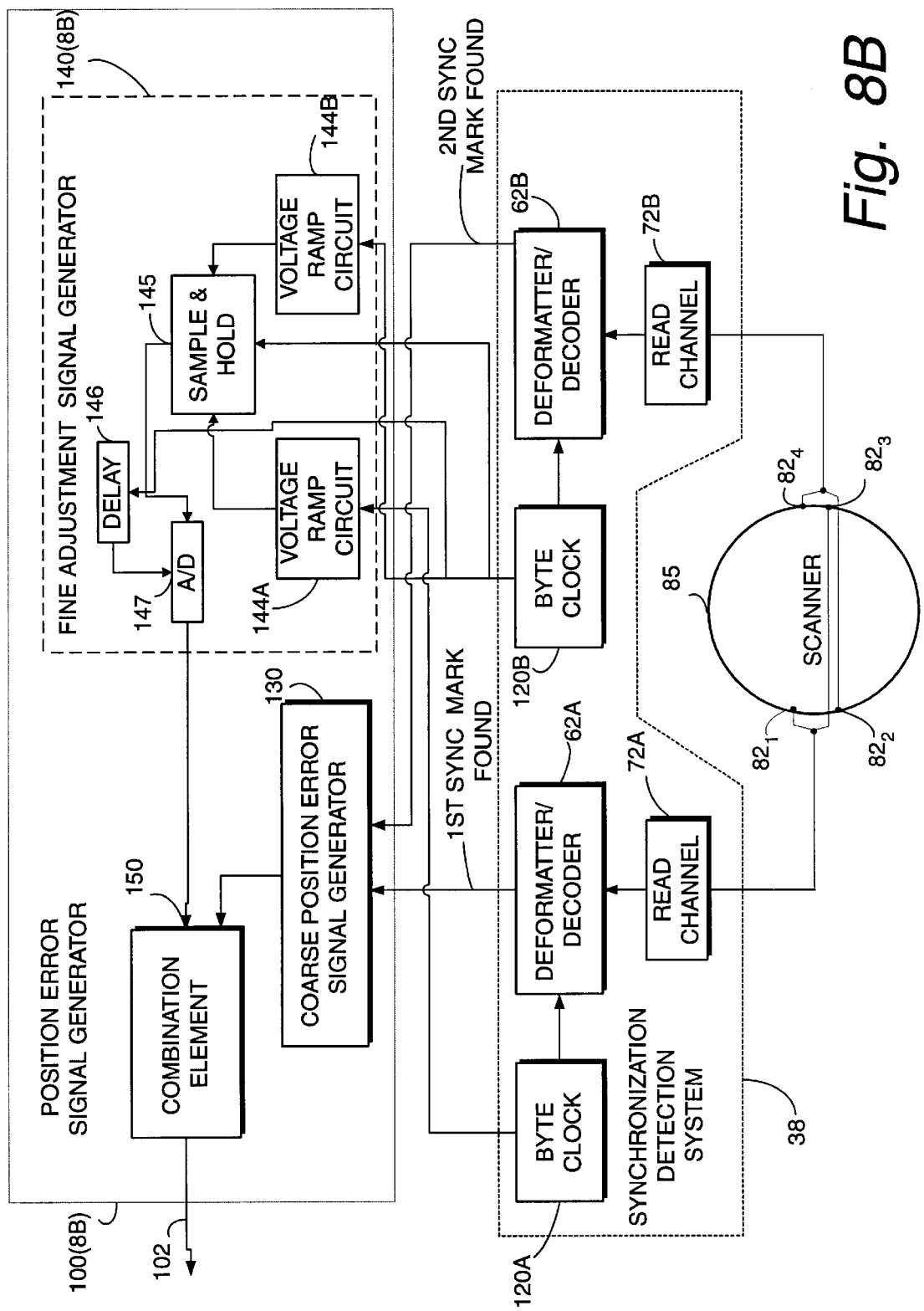
Figure 8C:
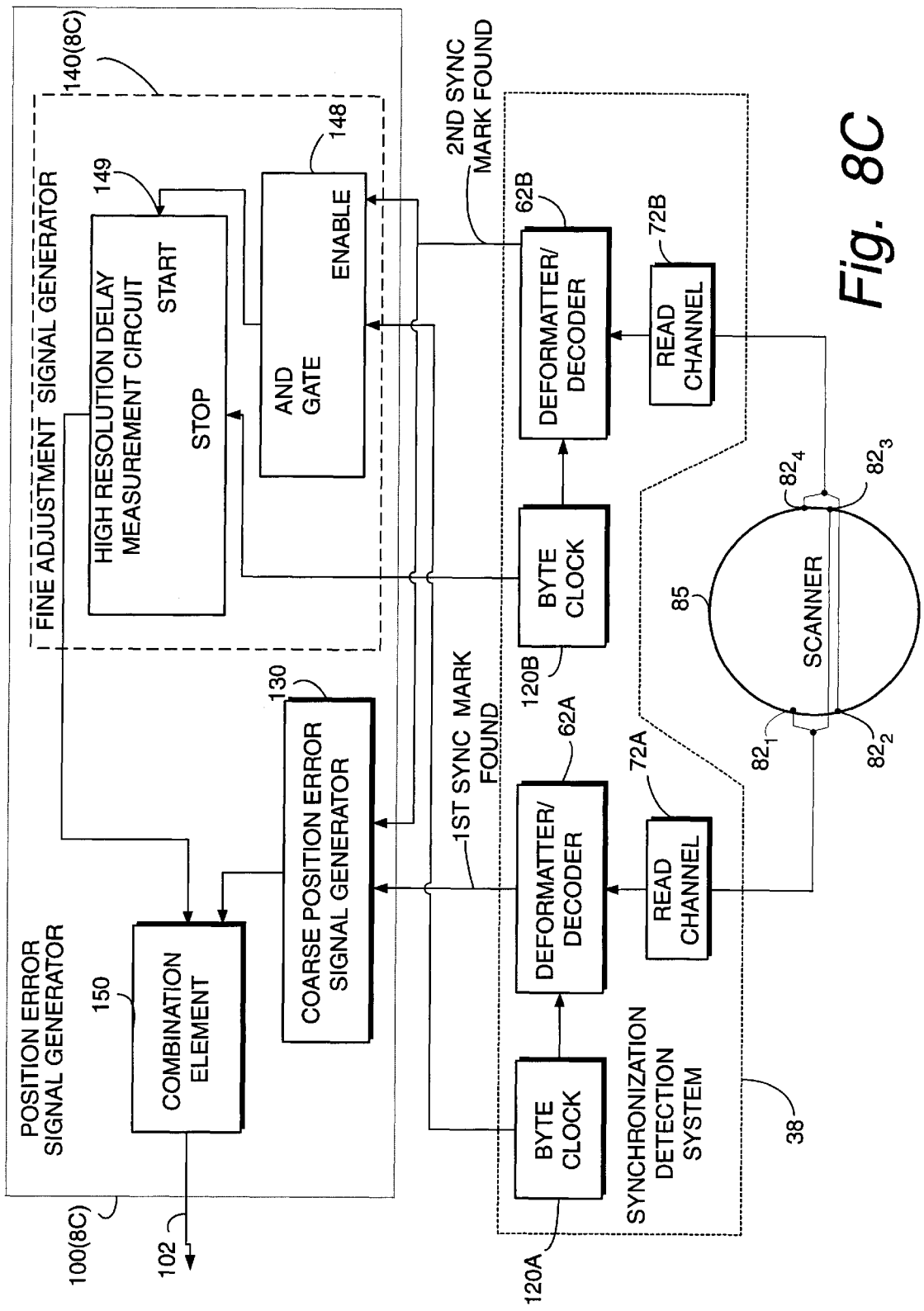

FIG. 8B shows a mixed analog/digital position error signal generator 100(8B) having a fine adjustment signal generator 140(8B) which essentially includes an analog timer in the form of a ramp generator. In particular, position error signal generator 100(8B) comprises two voltage ramp circuits 144A and 144B which are connected to receive the pulses from byte clocks 120A and 120B, respectively. The byte clock pulses from byte clock 120B are also applied to a sample enable input of sample and hold circuit 145 and to a delay element 146. An analog output of the voltage ramp circuit 144A is applied to a sample accumulate input of sample and hold circuit 145. An analog value held in sample and hold circuit 145 is applied to analog to digital (A/D) converter 147. The analog to digital (A/D) converter 147 is enabled to convert when it receives an appropriate signal at its convert enable input from delay element 146. The digitally convertered value obtained by analog to digital (A/D) converter 147 is a delay time which is output to combination element 150. The combination element 150 uses the digital delay time output from analog to digital (A/D) converter 147 as a fine adjustment to the coarse position error signal previously described, e.g., with reference to FIG. 6 and FIG. 7.

Although not specifically shown as such, it should be understood that the output of voltage ramp circuit 144B can be connected and utilized in like manner as the output from voltage ramp circuit 144A to facilitate creation of a similar fine adjustment signal during reset of voltage ramp circuit 144A.

Figure 10:
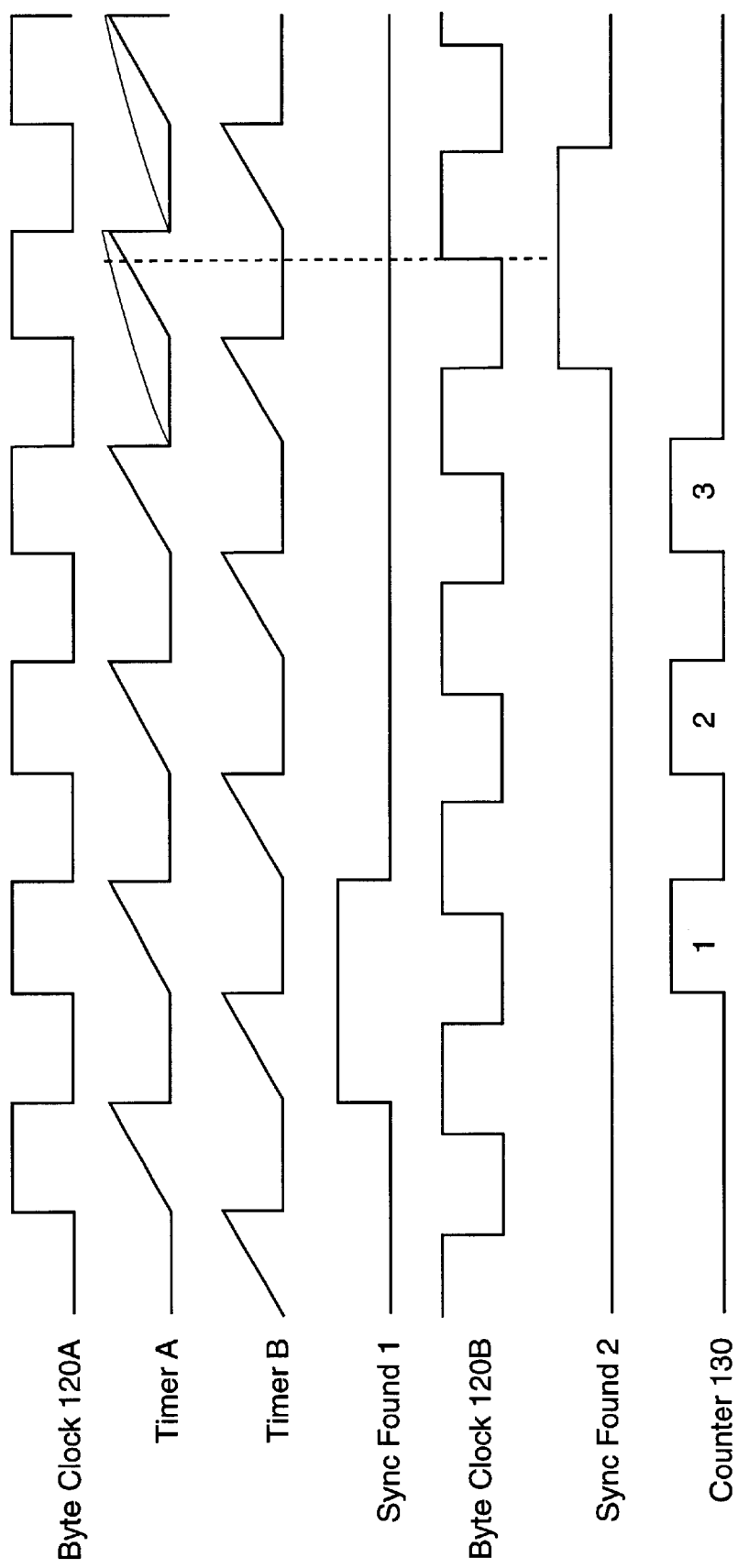
FIG. 10 is a graph depicting generation of a fine adjustment signal in accordance with the embodiment of FIG. 8B.

FIG. 10 shows an example scenario for implementing the fine adjustment technique of the position error signal generator 100(8B) of FIG. 8B. FIG. 10 resembles FIG. 7 previously discussed, but additionally involves waveforms for the voltage ramp circuits 144A and 144B (shown as Timer A and Timer B in FIG. 10). As illustrated in FIG. 10, the voltage ramp circuits 144A and 144B start from opposite phases of byte clock 120A. This interlace of two timers (e.g., voltage ramp circuits 144A and 144B) allows one of the timers to be reset while the other is active, otherwise they could be treated as a single timer. This timer works by measuring the value of the timer voltage at the time of the rising edge on byte clock 120B. The value of the analog voltage in voltage ramp circuit 144A at the time of the rising edge of a pulse from byte clock 120B is applied to sample and hold circuit 145, as enabled by the sample enable input of sample and hold circuit 145 which is activated by the rising edge of a pulse from byte clock 120B. After a sufficient delay for the sample and hold circuit 145 to operate (which corresponds to the delay of 146), the sample value stored in sample and hold circuit 145 is applied to analog to digital (A/D) converter 147 in accordance with the delay timeout output from delay element 146.

The dotted line in FIG. 10 depicts the sample time in the example scenario of FIG. 10. In this case the sample is detected during the high portion of the pulse from byte clock 120A. This equates to a negative value for the fine position error signal (PES). Likewise, if the sample had been detected during the second half (low) of the pulse of byte clock 120A, the fine position error signal (PES) would be positive. Zero is the point where byte clock 120A falls.

While in FIG. 8B the value of the analog voltage in voltage ramp circuit 144A is captured using sample and hold circuit 145 followed by analog to digital (A/D) converter 147, the capture could alternatively be accomplished using a flash A/D converter.

The resolution of the measurement for the position error signal generator 100(8B) of FIG. 8B is a function only of the resolution of analog to digital (A/D) converter 147 and the SNR on the voltage ramp circuits 144A and 144B. In the illustrated example, the sample is at minus one quarter of the full-scale reading. To obtain the final position error signal (PES) 102, this fine adjustment value output from analog to digital (A/D) converter 147 is added to the course PES from counter 130, which in this case is 3 times the full-scale reading. So in the illustrated scenario the final answer is 2.75 times the full scale reading of analog to digital (A/D) converter 147.

The accuracy of the position error signal generator 100(8B) of FIG. 8B is dependent on the accuracy of voltage ramp circuits 144A and 144B. Either the ramp speed must be slaved to a clock reference by use of something such as a phase locked loop (PLL), or it must be calibrated. This calibration can be as simple as measuring the ramp when byte clock 120A falls by using Not Byte Clock 120B as the trigger rather than Byte Clock 120B, and then scaling the output from analog to digital (A/D) converter 147 accordingly.

FIG. 8C shows yet another embodiment featuring position error signal generator 100(8C) with its fine adjustment signal generator 140(8C). The fine adjustment signal generator 140(8C) is substantially entirely digital, comprising an AND gate 148 and a high resolution delay measurement circuit 149. The AND gate 148 has a first pin (its enable pin) connected to receive the $2^{nd}$ SYNC MARK FOUND signal generated by deformatter/decoder 62B, and a second input pin connected to the output of byte clock 120A. The output of AND gate 148 is applied to a start input terminal of high resolution delay measurement circuit 149. A end or stop input terminal of high resolution delay measurement circuit 149 is connected to the output of byte clock 120B. The output of high resolution delay measurement circuit 149, which is a digital delay time value, is applied to combination element 150 in a manner similar to the previously described embodiments.

Figure 11:
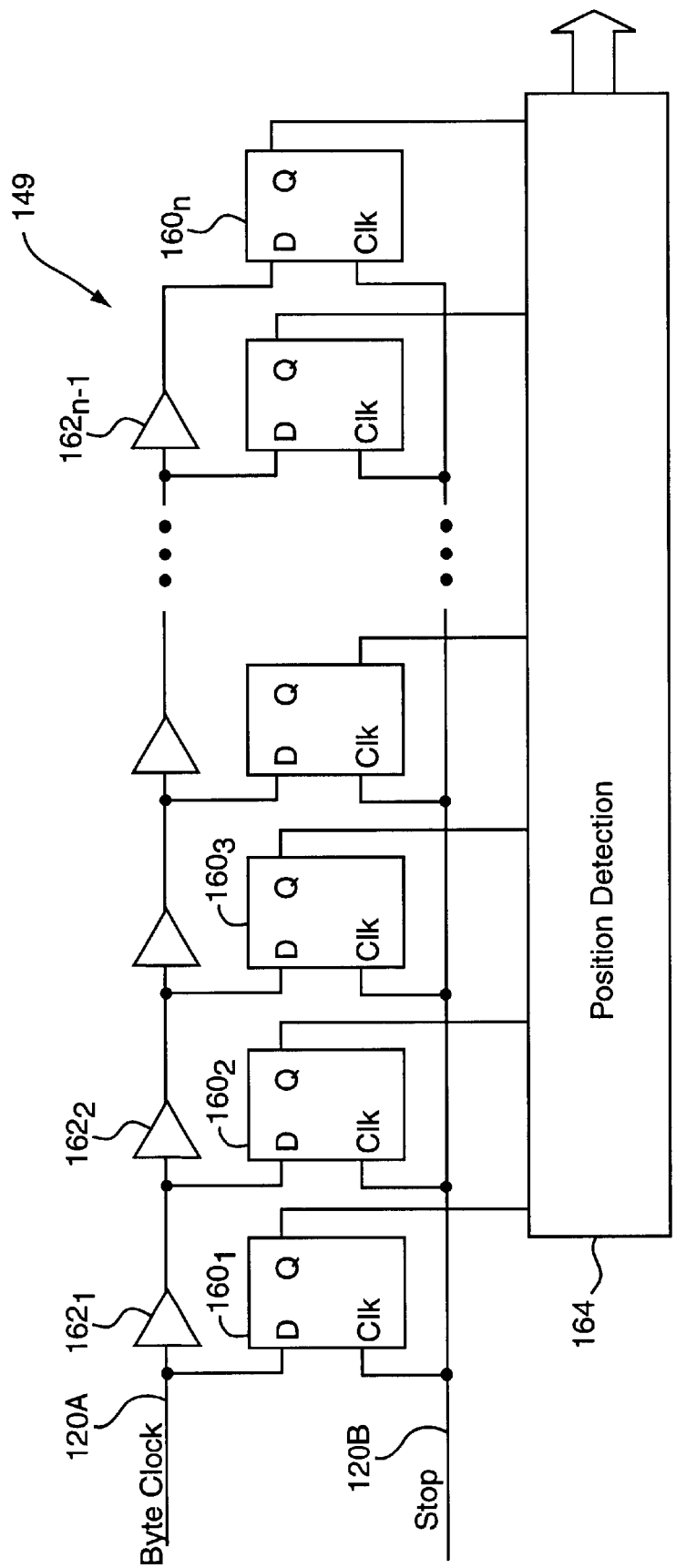
FIG. 11 is a schematic view of an example high resolution delay measurement circuit utilized in conjunction with the embodiment of FIG. 8C.

As shown in FIG. 11, the high resolution delay measurement circuit 149 comprises plural gate elements $160_1$ through $160_n$. Each gate element 160 has a D input pin, a Q output pin, and a clock input pin (Clk). A delay element 162 is connected between the D input pins of each pair of adjacent gate elements 160, so that high resolution delay measurement circuit 149 also comprises delay elements $162_1$ through $162_{n-1}$. The Q output pins of the gate element 160 are connected to a position detection circuit 164.

The rising edge of a pulse from byte clock 120A is applied to the D input pin of gate element $160_1$ and to delay element $162_1$, and via delay element $162_1$ to gate element $160_2$ and delay element $162_2$, and so forth to the other gate elements 160 and delay elements 162 of high resolution delay measurement circuit 149. The Clk input pin of each gate element 160 receives the output of AND gate 148, which is the ANDing of the rising edge of a pulse from byte clock 120B and the $2^{nd}$ SYNC MARK FOUND signal generated by deformatter/decoder 62B.

The high resolution delay measurement circuit 149 thus comprises a chain of gate elements 160. Upon receipt of the transition of a first clock signal (e.g., a specified transition from byte clock 120A), the gate elements 160 are successively switched from an inactive state (e.g., untriggered) to an active state (e.g., triggered). Upon a transition of a second clock signal (e.g., a specified transition from byte clock 120B), the gate elements 160 are all enabled to output their states to position detection circuit 164. The position detection circuit 164 determines the number of gate elements 160 which have reached the active state (e.g., the number of gate elements 160 which have been triggered), and based on such number (and the predetermined delay time between each link of the chain [e.g., each delay element 162]), outputs an indication of the delay time. This delay time output from position detection circuit 164 is used as the fine adjustment signal which is applied to combination element 150.

The high resolution delay measurement circuit 149 thus measures the number of gate delays (e.g., gate elements 160) through which the rising edge of a pulse from byte clock 120A can propagate before a rising edge of a pulse from byte clock 120B is encountered should the $2^{nd}$ SYNC MARK FOUND signal be generated. The maximum resolution of a scheme such as this is a single gate delay, but if the basic delay (e.g., of each delay element 162) is 0.2 nSec, then this resolution is on the order of 50 times better than using the byte clocks 120 by themselves. The buffer chain of gate elements 160 required has to be at least as long as necessary to handle the byte clock 120A, which on one embodiment can be about 400 buffers assuming a 0.2 nSec delay.

As alluded to above, the purpose of the position detection circuit 164 is to locate the transition, e.g., the demarcation between which gate elements 160 have been activated or triggered and which gate elements 160 remain inactive. This transition direction measurement can be set up to be a function of the polarity of byte clock 120A in the manner illustrated in FIG. 11, and which case only the single timer chain of gate elements 160 is required per timer. If the last recorded input transition were low to high, then the low to high transition would be measured. The polarity, as in the previous embodiment, would also be assumed to be negative. Likewise, if the last transition were high to low, the high to low transition would be recorded, and the polarity assumed to be positive.

In a variation of the high resolution delay measurement circuit 149 of FIG. 11, a second complete timer can be utilized when it is desired instead to measure the time from byte clock 120B to byte clock 120A. The timer of this variation is essentially the same as the timer of FIG. 11, just with its inputs reversed.

The output of the high resolution delay measurement circuit 149 of FIG. 11 represents the time between byte clock 120A and byte clock 120B. The timer of the high resolution delay measurement circuit 149 of FIG. 11 needs to be calibrated. One example manner of performing such calibration is to replace the input from AND gate 148 (the "STOP" input) with the inverse of byte clock 120A. In this fashion the length on a half clock period can be measured.

A second example methodology of calibration is to replace both inputs with a reference clock that has been divided by two removing any asymmetry. By using a reference clock the speed variation of the read clock is also removed.

In the preceding discussion it has predominately been assumed that the time from byte clock 120A to byte clock 120B was being measured. Clearly the roles could be reversed, measuring byte clock 120B to byte clock 120A. Such reversal entails a doubling of the hardware, but as the hardware is simple this is not a great cost. In practice, the smaller of the two samples is retained for utilization, reducing errors that would accumulate over time. Use of a second set of samples also alters the polarity of the error signal; for example if the transition from byte clock 120A to byte clock 120B is used the error would be assumed to be positive, if reversed it would be negative.

The position error signal generator 100(8C) of the embodiment of FIG. 8C, with its high resolution delay measurement circuit 149, allows integration into a digital ASIC it would. Therefore, the servo function can be integrated entirely into a controller function, minimizing cost and space.

Calibration

Calibration of the embodiments described herein is advisable since the relative position of (e.g., distance between) the two read heads of a read head pair is not well known, and typically varies greatly over production. Such variation in the distance separating the two read heads of a pair, if not otherwise compensated, could generate an unknown time offset into the position error signal (PES) 102. This unknown time offset due to uncertain read head separation is potentially larger than the dynamic range of the position error signal (PES) 102, so it needs to be accounted for.

The easiest way to calibrate the position error signal (PES) 102 is to generate a position transfer function. A position transfer function can be created by running (e.g., transporting) the tape 31 at a different linear speed than nominal. If it is run at the nominal speed then only one error value, combined with noise, will be returned. By running it off speed all values of error will be returned. The heterodyne frequency required is a function of the desired maximum error. For example if a slip frequency of 10% is used (90 or 110% of the nominal speed) then the maximum error present is 10%. This is because the error signal will be changing 10% on each sample, so if the first sample is at 1%, then each sample will be 10% higher (assuming no speed error), the final sample being at 91%. This will result in the center of the transfer function being 4% off (9% low on the top, 1% high on the bottom, divide by two, resulting in a center 4% low). Clearly if greater accuracy is desired then a smaller slip frequency, with more tracks sampled, is required. The maximum useful resolution can be calculated by using the system SNR, clearly if the error is smaller than the SNR then there is no point to additional samples. It should also be noted that because the midpoint is the average of the endpoints the errors are divided in two.

Figure 12:
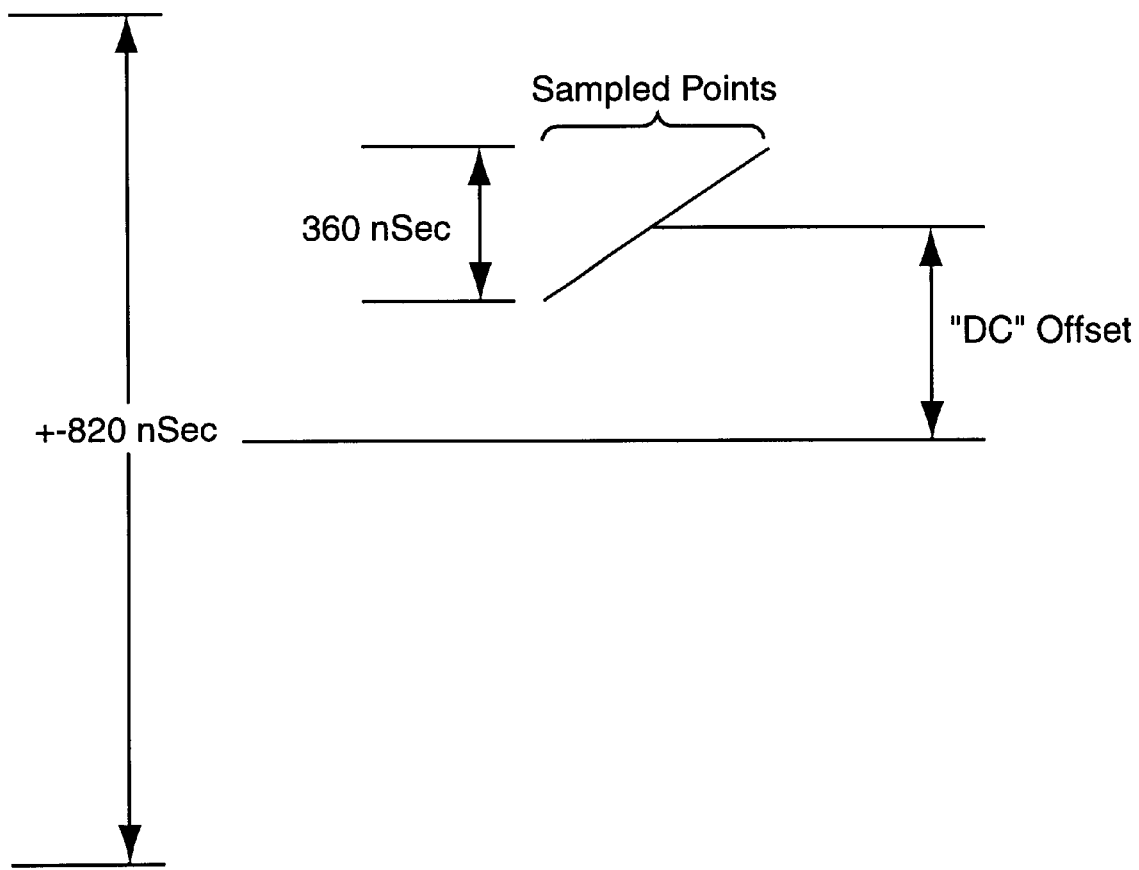
FIG. 12 is a diagrammatic view depicting calibration utilized by a transport controller in accordance with an embodiment of the present invention.

FIG. 12 illustrates an example calibration technique suitable for use with the present invention. In FIG. 12, the "DC" Offset to shown to change over the range of ±820 nSec, and the relative magnitude of the position error signal (PES) 102 is also shown. As indicated above, the calibration can be performed by moving the tape at some percentage of the nominal speed for a period of time such that the desired maximum error is achieved. The minimum and maximum values are then averaged together, and this value used as track center or calibration offset value COV.

The example calibration procedure described can also be done on each pre-written tape inserted so that an offset for that tape could be measured. On tapes that the drive is writing for the first time a factory calibrated value would be used. An example procedure for factory calibration is to write on unwritten media at the nominal speed, backup to the start of this write, then sample the position error signal (PES) 102 at the offset speed, calibrating in the same fashion as if a pre-written tape had been used.

The transport controller 98 uses the calibration offset value COV, illustrated as the "DC" offset in FIG. 12, to generate a transport drive error signal (TDE) which satisfies Expression 4:

$$(PES-COV)+TDE=0. \qquad \text{Expression 4}$$

The transport drive error signal (TDE) is applied to one or both of the reel motors 94, 96, to either increase or decrease the linear speed of tape 31. The value of the transport drive error signal (TDE) is such as to urge the read heads 82 back to the longitudinal centerline of the tracks they follow.

It will be apparent that the phase based time domain tracking described herein has numerous advantages. Rather than extract positional information from low frequency data embedded in the format, features already present in the format are used. This implies that the low frequency servo information may be removed, improving the format efficiency, and that a head narrower than the followed track may be used. Further, with some embodiments, the servo position error can be measured using digital circuitry which may be included with the controller, rather than low level analog circuitry, thereby reducing the parts count and cost of the product.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A helical scan recording system comprising:
a scanner which rotates at a rotational speed;
a tape transport for transporting the magnetic tape proximate the scanner;
at least a first pair of read heads mounted on the scanner, the first pair of read heads comprising a first read head and a second read head which travel in a helical direction on the magnetic tape as at least a partial result of transport of the tape and rotation of the scanner, the first read head and the second read head respectively reading information from a first track and a second track recorded on magnetic tape;
a synchronization detection system which determines a first synchronization mark detection time at which a first synchronization mark is read by the first read head from the first track and a second synchronization mark detection time at which a synchronization mark read by the second read head from the second track;
a position error signal generator which develops a position error signal based upon a difference between the first synchronization mark detection time and the second synchronization mark detection time;
a servo controller which uses the position error signal to develop a servo correction signal for adjusting a position of the first head relative to a width of the first track and the second head relative to the width of the second track;
wherein a first distance along the helical direction between the synchronization mark read by the first read head on the first track and the synchronization mark read by the second read head on the second track is sufficiently less than a second distance by which the first head is spaced circumferentially on the scanner from the second head to render the position error signal immune to any variation in the rotational speed of the scanner;
wherein the synchronization detection system comprises:
a first read channel which receives a first read signal from the first read head;
a second read channel which receives a second read signal from the second read head;
a first deformatter connected to the first read channel, the first deformatter including a first byte clock which times on a byte basis receipt of bytes of information from the first read head, the first deformatter detecting the first synchronization mark and outputting a first synchronization mark found signal at the first synchronization mark detection time, the first synchronization mark detection time being based on the first byte clock;
a second deformatter connected to the second read channel, the second deformatter including a second byte clock which times on a byte basis receipt of bytes of information from the second read head, the second deformatter detecting the second synchronization mark and outputting a second synchronization mark found signal at the second synchronization mark detection time, the second synchronization mark detection time being based on the second byte clock.

2. The helical scan recording system of claim 1, wherein the position error signal generator comprises a coarse position error signal generator which uses the first synchronization mark found signal and second first synchronization mark found signal to develop a coarse position error signal based upon a difference between first synchronization mark detection time and the second synchronization mark detection time, and wherein the coarse position error signal is dependent upon the frequency of the first byte clock and the second byte clock.

3. The helical scan recording system of claim 2, wherein the coarse position error signal generator comprises a counter.

4. The helical scan recording system of claim 2, wherein the position error signal generator further comprises:
a fine adjustment signal generator which generates an adjustment signal to compensate for the first synchronization mark detection time being based on the first byte clock and the second synchronization mark detection time being based on the second byte clock;

a combination element which combines the course position error signal and the adjustment signal to obtain the position error signal which is used by the servo controller.

5. The helical scan recording system of claim 4, wherein the first deformatter outputs a first bit position signal to the fine adjustment signal generator indicative of a bit position in which the first synchronization mark is detectable;

wherein the second deformatter outputs a second bit position signal to the fine adjustment signal generator indicative of a bit position in which the second synchronization mark is detectable; and wherein the fine adjustment signal generator comprises a comparator which compares the first bit position signal and the second bit position signal to generate a bit offset as the adjustment signal.

6. The helical scan recording system of claim 4, wherein the fine adjustment signal generator comprises:

a ramp voltage circuit which ramps through a range of analog voltage values upon enablement by the first byte clock;

a circuit which provides a digital value corresponding to an analog voltage reached in the range when a signal is output from the second byte clock, the digital value being indicative of a delay time, the delay time being applied as the adjustment signal.

7. The helical scan recording system of claim 4, wherein the fine adjustment signal generator comprises:

a ramp voltage circuit which ramps through a range of analog voltage values upon enablement by the first byte clock;

a sample and hold circuit which samples an analog voltage value of the ramp voltage circuit at a time corresponding to a signal from the second byte clock;

an analog to digital converter which converts the sampled analog voltage to a digital value, the digital value being indicative of a delay time, the delay time being applied as the adjustment signal.

8. The helical scan recording system of claim 4, wherein the fine adjustment signal generator comprises a high resolution delay measurement circuit which includes a chain of gate elements, wherein upon a transition of a signal from the first byte clock the gate elements are successively switched from an inactive state to an active state, there being a predetermined time delay between successive activation of gate elements, and wherein a transition of a signal from the second byte clock enables the gate elements to output their states, the number of gate elements having the active state being indicative of a delay time which is used as the adjustment signal.

9. A helical scan recording system comprising:

a scanner which rotates at a rotational speed;

a tape transport for transporting the magnetic tape proximate the scanner;

at least a first pair of read heads mounted on the scanner, the first pair of read heads comprising a first read head and a second read head which travel in a helical direction on the magnetic tape as at least a partial result of transport of the tape and rotation of the scanner, the first read head and the second read head respectively reading information from a first track and a second track recorded on magnetic tape;

a synchronization detection system which determines a first synchronization mark detection time at which a synchronization mark is read by the first read head from the first track and a second synchronization mark detection time at which a synchronization mark read by the second read head from the second track;

a position error signal generator which develops a position error signal based upon a difference between the first synchronization mark detection time and the second synchronization mark detection time;

a servo controller which uses the position error signal to develop a servo correction signal for adjusting a position of the first head relative to a width of the first track and the second head relative to the width of the second track;

wherein the position error signal generator comprises:

a coarse position error signal generator which develops a coarse position error signal based upon a difference between first synchronization mark detection time and the second synchronization mark detection time, the first synchronization mark detection time and the second synchronization mark detection time being dependent upon byte clock resolution;

a fine adjustment signal generator which generates an adjustment signal to compensate for the first synchronization mark detection time and the second synchronization mark detection time being dependent upon byte clock resolution;

a combination element which combines the course position error signal and the adjustment signal to obtain the position error signal which is used by the servo controller.

10. The helical scan recording system of claim 9, wherein the synchronization detection system comprises a first deformatter and a second deformatter;

wherein the first deformatter outputs a first bit position signal to the fine adjustment signal generator indicative of a bit position in which the first synchronization mark is detectable;

wherein the second deformatter outputs a second bit position signal to the fine adjustment signal generator indicative of a bit position in which the second synchronization mark is detectable; and wherein the fine adjustment signal generator comprises a comparator which compares the first bit position signal and the second bit position signal to generate a bit offset as the adjustment signal.

11. The helical scan recording system of claim 9, wherein the fine adjustment signal generator comprises:

a ramp voltage circuit which ramps through a range of analog voltage values upon enablement by a first byte clock;

a circuit which provides a digital value corresponding to an analog voltage reached in the range when a signal is output from the second byte clock, the digital value being indicative of a delay time, the delay time being applied as the adjustment signal.

12. The helical scan recording system of claim 9, wherein the fine adjustment signal generator comprises:

a ramp voltage circuit which ramps through a range of analog voltage values upon enablement by a first byte clock;

a sample and hold circuit which samples an analog voltage value of the ramp voltage circuit at a time corresponding to a signal from a second byte clock;

an analog to digital converter which converts the sampled analog voltage to a digital value, the digital value being indicative of a delay time, the delay time being applied as the adjustment signal.

13. The helical scan recording system of claim 9, wherein the fine adjustment signal generator comprises a high resolution delay measurement circuit which includes a chain of gate elements, wherein upon a transition of a signal from a first byte clock the gate elements are successively switched from an inactive state to an active state, there being a predetermined time delay between successive activations of gate elements, and wherein a transition of a signal from a second byte clock enables the gate elements to output their states, the number of gate elements having the active state being indicative of a delay time which is used as the adjustment signal.

14. A method of operating a helical scan recording system comprising:

rotating a scanner at a rotational speed;

transporting magnetic tape proximate the scanner;

reading information on the magnetic tape using at least a first pair of read heads mounted on the scanner, the first pair of read heads comprising a first read head and a second read head which travel in a helical direction on the magnetic tape as at least a partial result of transport of the tape and rotation of the scanner, the first read head and the second read head respectively reading information from a first track and a second track recorded on magnetic tape;

determining a first synchronization mark detection time at which a synchronization mark is read by the first read head from the first track;

determining a second synchronization mark detection time at which a synchronization mark read by the second read head from the second track;

generating a position error signal based upon a difference between the first synchronization mark detection time and the second synchronization mark detection time;

using the position error signal to develop a servo correction signal for adjusting a position of the first head relative to a width of the first track and the second head relative to the width of the second track;

wherein the step of generating the position error signal comprises:

generating a coarse position error signal based upon a difference between first synchronization mark detection time and the second synchronization mark detection time, the first synchronization mark detection time and the second synchronization mark detection time being dependent upon byte clock resolution;

generating a fine adjustment signal to compensate for the first synchronization mark detection time and the second synchronization mark detection time being dependent upon byte clock resolution;

combining the course position error signal and the adjustment signal to obtain the position error signal.

15. The method claim 14, further comprising:

using a first deformatter to output a first bit position signal to the fine adjustment signal generator indicative of a bit position in which the first synchronization mark is detectable;

using a second deformatter to output a second bit position signal to the fine adjustment signal generator indicative of a bit position in which the second synchronization mark is detectable; and comparing the first bit position signal and the second bit position signal to generate a bit offset as the adjustment signal.

16. The method claim 14, further comprising:

ramping a ramp voltage circuit through a range of analog voltage values upon enablement by a first byte clock;

generating a digital value corresponding to an analog voltage reached in the range when a signal is output from a second byte clock, the digital value being indicative of a delay time, the delay time being applied as the adjustment signal.

17. The method of claim 14, further comprising:

ramping a ramp voltage circuit through a range of analog voltage values upon enablement by a first byte clock;

sampling with a sample and hold circuit an analog voltage value of the ramp voltage circuit at a time corresponding to a signal from a second byte clock;

convering the sampled analog voltage to a digital value, the digital value being indicative of a delay time, the delay time being applied as the adjustment signal.

18. The method of claim 14, further comprising using as a fine adjustment signal generator a high resolution delay measurement circuit which includes a chain of gate elements, wherein:

upon a transition of a signal from a first byte clock, the gate elements are successively switched from an inactive state to an active state;

providing a predetermined time delay between successive activations of gate elements; and wherein a transition of a signal from a second byte clock enables the gate elements to output their states, the number of gate elements having the active state is used as an indication of a delay time, the indication of delay time being is used as the adjustment signal.

* * * * *